US 12,204,032 B2

(12) United States Patent
Yang et al.

(10) Patent No.: US 12,204,032 B2
(45) Date of Patent: Jan. 21, 2025

(54) REPRESENTATION DATA GENERATION OF THREE-DIMENSIONAL MAPPING DATA

(71) Applicant: SZ DJI TECHNOLOGY CO., LTD., Guangdong (CN)

(72) Inventors: Zhenyu Yang, Guangdong (CN); Weifeng Liu, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 879 days.

(21) Appl. No.: 17/068,649

(22) Filed: Oct. 12, 2020

(65) Prior Publication Data

US 2022/0113423 A1 Apr. 14, 2022

(51) Int. Cl.
| | |
|---|---|
| *G01S 17/894* | (2020.01) |
| *B64U 20/87* | (2023.01) |
| *B64U 101/30* | (2023.01) |
| *G06T 15/20* | (2011.01) |
| *G06V 20/10* | (2022.01) |
| *G06V 20/20* | (2022.01) |

(52) U.S. Cl.
CPC .......... *G01S 17/894* (2020.01); *G06T 15/20* (2013.01); *G06V 20/176* (2022.01); *G06V 20/20* (2022.01); *B64U 20/87* (2023.01); *B64U 2101/30* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 4,970,666 A | 11/1990 | Welsh et al. | |
| 10,587,286 B1* | 3/2020 | Flynn | H03M 7/40 |
| 10,650,278 B1* | 5/2020 | Ho | G06V 10/26 |
| 2004/0247173 A1 | 12/2004 | Nielsen et al. | |
| 2013/0103303 A1* | 4/2013 | Lynch | G06T 15/205 |
| | | | 701/410 |
| 2015/0190925 A1* | 7/2015 | Hoffman | B25J 9/161 |
| | | | 901/47 |
| 2015/0193963 A1 | 7/2015 | Chen et al. | |
| 2020/0018852 A1* | 1/2020 | Walls | G01S 7/4972 |
| 2020/0200907 A1 | 6/2020 | Li et al. | |

FOREIGN PATENT DOCUMENTS

| | | |
|---|---|---|
| CN | 105022837 A | 11/2015 |
| CN | 107369205 A | 11/2017 |
| CN | 110136273 A | 8/2019 |

OTHER PUBLICATIONS

International Search Report and Written Opinion, PCT App. No. PCT/CN2021/072007, Jul. 12, 2021, 10 pages.
Extended European search report issued on Jun. 23, 2023, in corresponding European patent Application No. 21844603.7, 8 pages.

* cited by examiner

*Primary Examiner* — Luke D Ratcliffe

(74) *Attorney, Agent, or Firm* — ANOVA LAW GROUP, PLLC

(57) ABSTRACT

Techniques are disclosed for generating representation data of mapping data in a movable object environment. A method of generating representation data of three-dimensional mapping data may include: receiving three-dimensional mapping data captured by a sensor; generating representation data by projecting the three-dimensional mapping data onto a two-dimensional plane based on a selected perspective of view; and associating the representation data with the three-dimensional mapping data.

20 Claims, 18 Drawing Sheets

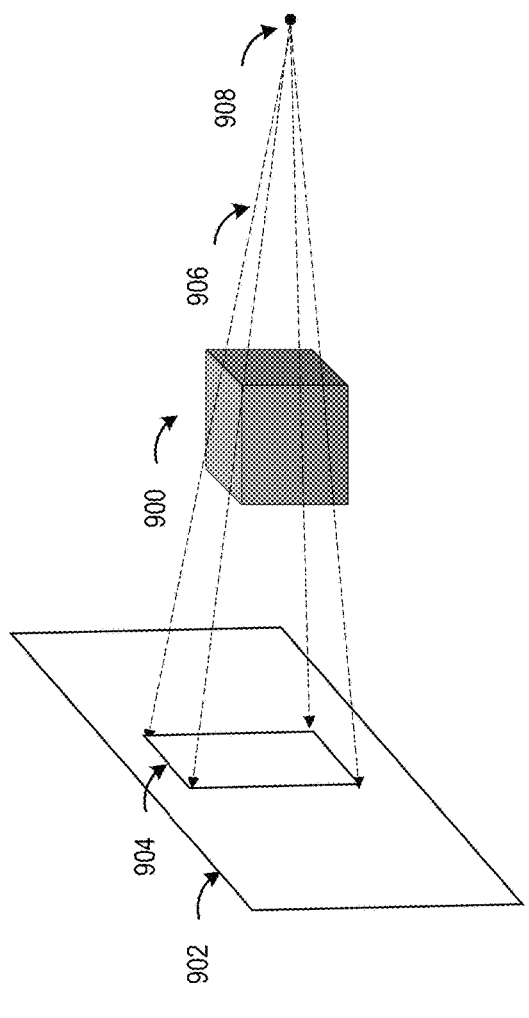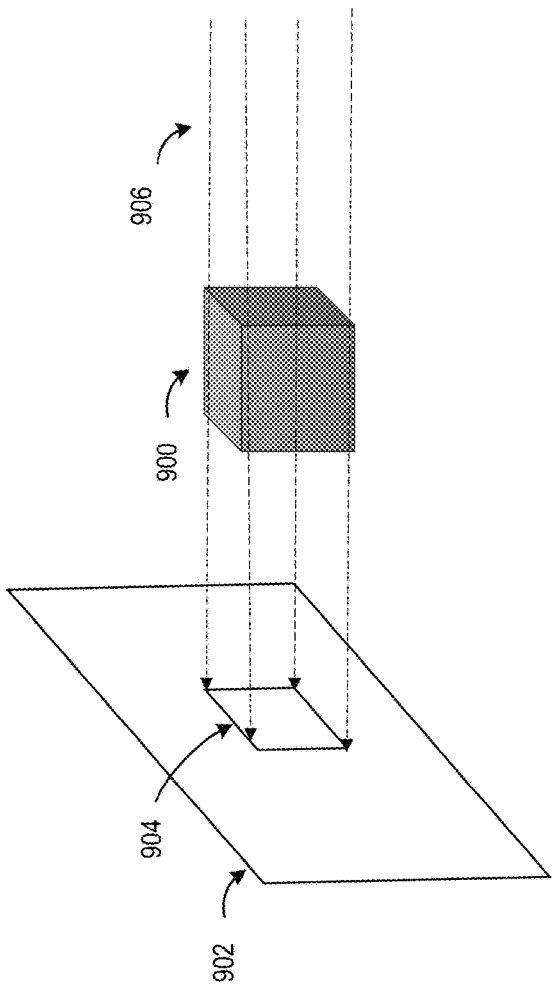

REPRESENTATION DATA GENERATION OF THREE-DIMENSIONAL MAPPING DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for mapping data collected in a movable object environment and more particularly, but not exclusively, to techniques for generating representation data of collected mapping data to be rendered on a client device.

BACKGROUND

Movable objects such as unmanned aerial vehicles (UAVs) can be used for performing surveillance, reconnaissance, and exploration tasks for various applications. Movable objects may carry a payload, including various sensors, which enables the movable object to capture sensor data during movement of the movable objects. The captured sensor data may be rendered on a client device, such as a mobile device or a terminal that is in communication with the movable object via a remote control, remote server, or other computing device.

SUMMARY

Techniques are disclosed for generating representation data of collected mapping data in a movable object environment. A method of generating representation data of three-dimensional mapping data may include receiving three-dimensional mapping data captured by a sensor of a payload coupled to an unmanned aerial vehicle (UAV), generating representation data by projecting the three-dimensional mapping data onto a two-dimensional plane based on a selected perspective of view, and associating the representation data with the three-dimensional mapping data.

BRIEF DESCRIPTION OF DRAWINGS

FIGS. 9A and 9B illustrates examples of projecting three-dimensional mapping data onto a two-dimensional plane, in accordance with various embodiments.

DETAILED DESCRIPTION

Figure 1:
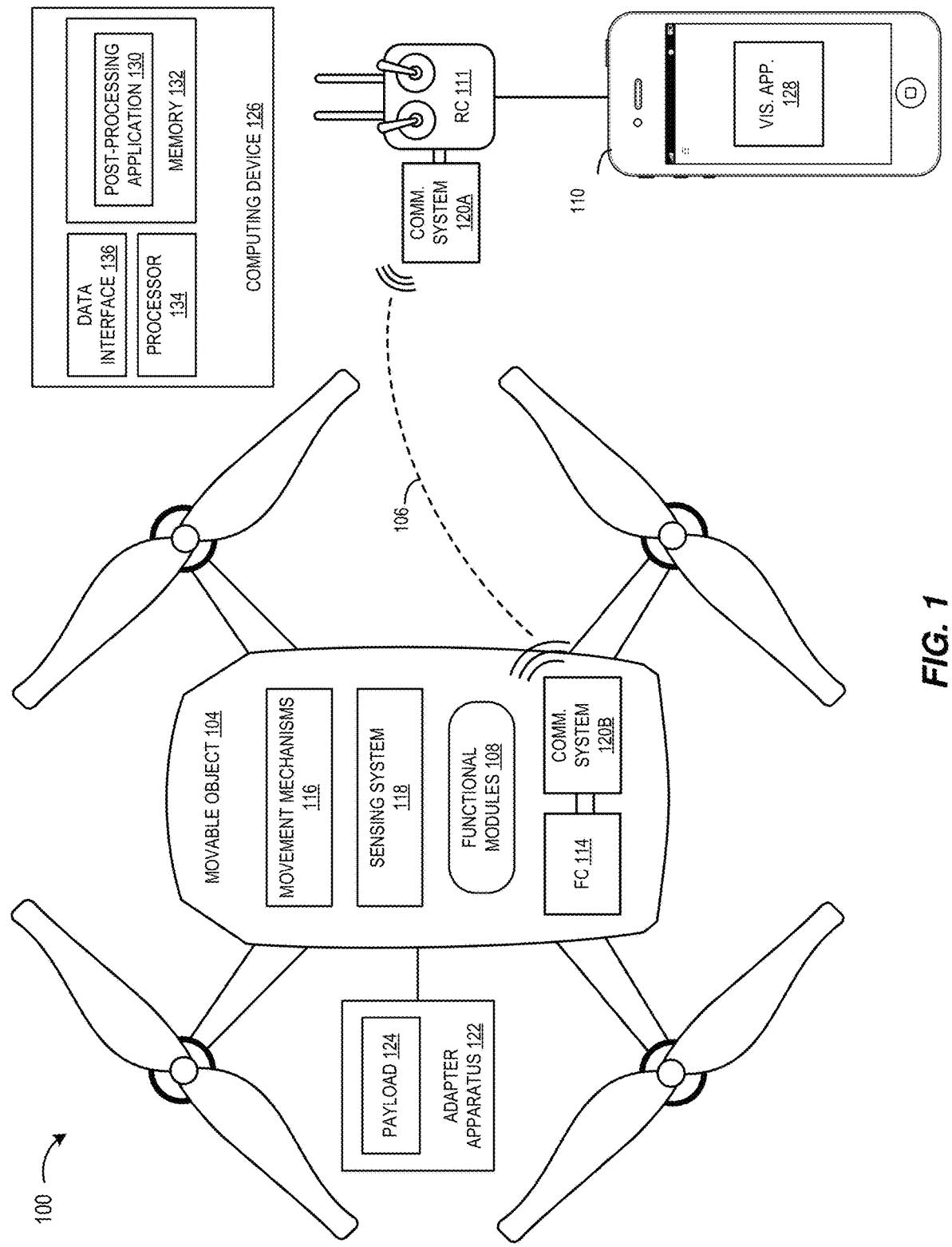
FIG. 1 illustrates an example of a movable object in a movable object environment, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes mapping data generation acquired by a movable object and representation data generation of the acquired mapping data. The movable object 104 can be an unmanned aircraft, an unmanned vehicle, a handheld device, and/or a robot. For simplicity of explanation, an unmanned aerial vehicle (UAV) is generally used as an example of a movable object. It will be apparent to those skilled in the art that other types of movable objects can be used without limitation.

Light detection and ranging (LiDAR) sensors can be used to generate very accurate maps of a target environment. However, LiDAR sensors produce a significant amount of data that is generally not readily viewed by a person right out of the box. Instead, significant configuration of the LiDAR sensor, along with additional sensors such as positioning sensors, along with significant post-processing of the collected data is needed to yield a map that can be usefully interpreted and/or used by a human for various applications. For example, a LiDAR sensor may collect mapping/scanning data relative to the LiDAR scanning sensor, and requires a highly accurate inertial navigation system to generate mapping data that can be transformed into a useful coordinate system (e.g., such as a global coordinate system). As such, to obtain useful mapping data, the complexity of the system and the complexity of the post-processing increases quite rapidly along with the cost of all of the components that are needed.

Additionally, because the mapping data is not readily human-interpretable in conventional systems the way traditional image data is, the human operator of a mapping system cannot readily identify any areas of the target environment that have not been mapped, or have been incompletely mapped. Instead, the operator of these conventional systems must wait for the data to be post-processed which may take hours or days. Then upon discovering that the mapping data is incomplete, the operator must perform additional mapping missions in the target environment to attempt to complete collection of the mapping data. This process may potentially iterate several times depending on the skill of the operator before the mapping is complete.

Additionally, after a mapping mission is completed, the collected large amount of raw mapping data or post-processing mapping data (such as after geo-referencing, outlier removal, downsampling process etc.) are stored in standard three-dimensional mapping data form, e.g., as a LAS file or a PLY file, which is usually in a large file size, which requires large processing time and data communication bandwidth to transmit the mapping data files. Further, when multiple mapping mission is conducted, multiple mapping data files are usually stored under a mission folder or in the same memory card, which can only be differentiated by the user based on the file generation time/name generated in time sequence. It makes the user hard to identify or choose the interested mapping data file for further processing (such as for downloading to post-process, or retrieving the file to view, etc.).

Embodiments enable a method to generate representation data of the original 3D mapping data, where the representation data is a 2D image that shows a preview of the 3D mapping data. The representation data is generated by projecting the original 3D mapping data onto a 2D image plane based on a preset or user selected perspective of view, such as a top view, a side view, or a view with the most feature points. The generated representation data may be stored as a separate image file and be associated with the original 3D mapping data. The generated representation data may be written into the original 3D mapping data at a reserved position by data insertion techniques, such as at a middle points of or appended at the tail data block of the 3D mapping data, to generate a newly combined mapping data, which has the same standard 3D mapping data form as the original 3D mapping data (e.g., a LAS file or a PLY file). Further, metadata of the representation data may also be generated and inserted into the combined mapping data at a reserved position, such as at a header data block of the mapping data.

Since in traditional system, the user can only visualize or comprehend the mapping data by the file time or file name that is generated in time sequence, it is hard for the user to recognize a specific mapping data, either from an online system to download the desired mapping data for playback or further processing, or from an off-line system to identify the desired mapping data stored in local memory for further processing. By generating the representation data of the 3D mapping data, user can intuitively visualize a 2D image preview and easily identify the interested mapping data to be downloaded online or to be retrieved offline without sorting through all the mapping mission by checking each file one-by-one. During the mapping mission, the user may also check the image previews through the visualization application on the client device to determine whether a specific area of the target object/environment has not been scanned, rather than downloading all the large size mapping data files to check the mapping mission progress.

Embodiments disclosed in the present disclosure significantly reduce data communication bandwidth, since the user can view the preview image first to determine whether to download a mapping data file for keeping records, checking missing areas to be scanned, or for further processing. Embodiments disclosed in the present disclosure also significantly reduce file processing time, since the generated representation data is stored in standard image file format, such as JPEG, GIF, PNG, TIFF, BMP files, etc., which has a much lower file size (e.g., in megabytes) than the file size of the standard mapping data (e.g., in gigabytes), such as LAS or PLY files. In some embodiments, the generated representation data may be stored in a different file. In such embodiments, when the user requires to generate a preview of the 3D mapping data, it can be easily retrieved in a short processing time due to its small size. Further, by keeping the file format of the combined point cloud data and the original point cloud data in consistency, the combined point cloud data is recognizable by commercial point cloud visualization application/service/browser provided online or off-line by any third party provider without further modifications.

FIG. 1 illustrates an example of a movable object in a movable object environment 100, in accordance with various embodiments. As shown in FIG. 1, client device 110 (e.g., a smartphone, tablet, remote terminal, a personal computer, or other mobile devices) in a movable object environment 100 can communicate with a movable object 104 via a communication link 106. The movable object 104 can be an unmanned aircraft, an unmanned vehicle, a handheld device, and/or a robot. The client device 110 can be a portable personal computing device, a smart phone, a remote control, a wearable computer, a virtual reality/augmented reality system, and/or a personal computer. Additionally, the client device 110 can include a remote control 111 and communication system 120A, which is responsible for handling the communication between the client device 110 and the movable object 104 via communication system 120B. For example, the communication between the client device 110 and the movable object 104 (e.g., an unmanned aerial vehicle (UAV)) can include uplink and downlink communication. The uplink communication can be used for transmitting control signals or commands, the downlink communication can be used for transmitting media or video stream, mapping/scanning data collected by scanning sensors, or other sensor data collected by other sensors.

In accordance with various embodiments, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include an adapter apparatus 122 and a payload 124 including a plurality of sensors, such as a scanning sensor (e.g., a LiDAR sensor), camera(s), and/or a collection of sensors in a single payload unit. In various embodiments, the adapter apparatus 122 includes a port for coupling the payload 124 to the movable object 104 which provides power, data communications, and structural support for the payload 124. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload 124 may be provided on the movable object 104 without requiring the adapter apparatus 122.

In accordance with various embodiments, the movable object 104 may include one or more movement mechanisms 116 (e.g., propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by a visualization application 128 executing on client device 110 or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110 or other computing entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, real-time kinematic (RTK) sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120B of the movable object 104 to one or more receivers of the communication system 120A of the client device 110, or vice-versa. Alternatively, the communication may be two-way communication, such that data can be transmitted in both directions between the movable object 104 and the client device 110. The two-way communication can involve transmitting data from one or more transmitters of the communication system 120B of the movable object 104 to one or more receivers of the communication system 120A of the client device 110, and transmitting data from one or more transmitters of the communication system 120A of the client device 110 to one or more receivers of the communication system 120B of the movable object 104.

In some embodiments, a visualization application 128 executing on client device 110 or other computing devices that are in communication with the movable object 104 can provide control data to one or more of the movable object 104, adapter apparatus 122, and payload 124 and receive information from one or more of the movable object 104, adapter apparatus 122, and payload 124 (e.g., position and/or motion information of the movable object, adapter apparatus or payload; data sensed by the payload such as image data captured by one or more payload cameras or mapping/scanning data captured by a payload LiDAR sensor; and data generated from image data captured by the payload camera or LiDAR data generated from mapping/scanning data captured by the payload LiDAR sensor).

In some embodiments, the control data may result in a modification of the location and/or orientation of the movable object (e.g., via control of the movement mechanisms 116), or a movement of the payload with respect to the movable object (e.g., via control of the adapter apparatus 122). The control data from the visualization application 128 may result in control of the payload 124, such as control of the operation of a scanning sensor, a camera or other image capturing device (e.g., taking still or moving pictures, zooming in or out, turning on or off, switching imaging modes, changing image resolution, changing focus, changing depth of field, changing exposure time, changing viewing angle or field of view, adding or removing waypoints, etc.).

In some instances, the communications from the movable object, adapter apparatus and/or payload may include information obtained from one or more sensors (e.g., of the sensing system 118 or of the payload 124 or other payload) and/or data (e.g., three-dimensional mapping data or point cloud obtained from the LiDAR sensor) generated based on the sensing information. The communications may include sensed information obtained from one or more different types of sensors (e.g., LiDAR sensors, GPS sensors, RTK sensors, motion sensors, inertial sensors, proximity sensors, or image sensors). Such information may pertain to the position (e.g., location, orientation), movement, or acceleration of the movable object, adapter apparatus, and/or payload. Such information from a payload may include data captured by the payload or a sensed state of the payload.

In some embodiments, the movable object 104 and/or payload 124 can include one or more processors, such as DSPs, CPUs, GPUs, field programmable gate arrays (FPGAs), system on chip (SoC), application-specific integrated circuit (ASIC), or other processors and/or accelerators. As discussed, the payload may include various sensors integrated into a single payload, such as a LiDAR sensor, one or more cameras, an inertial navigation system, etc. The payload can collect sensor data that is used to provide LiDAR-based mapping for various applications, such as construction, surveying, target inspection, etc.

In various embodiments, during a mapping mission, sensor data may be obtained by visualization application 128 from the payload 124, e.g., via connection 106 or through another connection between the client device 110 and the movable object 104 and/or payload 124. In some embodiments, the connection may be intermediated by one or more other networks and/or systems. For example, the movable object or payload may connect to a server in a cloud computing system, a satellite, or other communication system, which may provide the sensor data to the client device 110.

In some embodiments, the payload enables the raw mapping data to be stored locally to the storage media on the payload or the UAV for subsequent post-processing. In various embodiments, once a mapping mission is complete, sensor data may be obtained from the payload 124 and provided to computing device 126 for post-processing. For example, the payload 124 or the movable object 104 that is in communication with the payload 124 via the adapter apparatus 122 may include removable media, such as a secure digital (SD) card or other removable media such as flash memory-based memory devices. The removable media can store sensor data of a mapping mission obtained from the payload 124.

In some embodiments, the computing device 126 can be disposed off-board the movable object 104, such as at a ground terminal, the remote control 111, the client device 110, or other remote terminals. In such embodiments, the computing device 126 can include a data interface 136, such as a card reader, which can read the sensor data stored on the removable media. In other embodiments, the computing device 126 can be disposed onboard the movable object 104, such as at the payload 124 or within the movable object 104. In such embodiments, the computing device 126 can include a data interface 136, which can read the sensor data from an onboard memory of the payload 124 or the movable object 104, or from the removable media through an onboard card reader.

In some embodiments, the computing device 126 can operate on the data stored on the removable media directly or store a local copy, such as in memory 132, on disk (not shown) or other storage location accessible to the computing device 126, such as an attached storage device, network storage location, etc. The computing device 126 can include one or more processors 134, such as DSPs, CPUs, GPUs, field programmable gate arrays (FPGAs), system on chip (SoC), application-specific integrated circuit (ASIC), or other processors and/or accelerators. As shown, memory 132 can include a post-processing application 130 that processes raw mapping data to generate post-processed mapping/scanning data. The post-processed scanning data may be visualized by the visualization application 128 on the client device 110, such as being rendered on a display or touchscreen of the client device 110.

As discussed, the sensor data can include scanning data obtained from a LiDAR sensor or other sensor that provides high resolution scanning of a target environment, pose data indicating the attitude of the payload when the scanning data was obtained (e.g., from an inertial measurement unit), and positioning data from a positioning sensor (e.g., a GPS module, RTK module, or other positioning sensor), where the sensors providing the sensor data are all incorporated into a single payload 124. In some embodiments, various sensors incorporated into the single payload 124 can be pre-calibrated based on extrinsic and intrinsic parameters of the sensors and synchronized based on a reference clock signal shared among the various sensors. The reference clock signal may be generated by time circuitry associated with one of the various sensors or a separate time circuitry connecting the various sensors. In some embodiments, the positioning data from the positioning sensor may be updated based on correction data received from a positioning sensor of the movable object 104 which may be included in functional modules 108, sensing system 118, or a separate module coupled to movable object 104 which provides positioning data for the movable object. In some embodiments, the scanning data can be geo-referenced using the positioning data and used to construct the map of the target environment.

The geo-referenced scanning data and the payload pose data can be provided to the post-processing application 130 for post-processing into a human readable form, as discussed further below. In some embodiments, the post-processing application 130 can output an optimized map as a LiDAR Data Exchange File (LAS) or a Polygon (PLY) file which may be used by various tools, such as visualization application 128, to render the map of the target environment and/or use the mapping data for further processing, planning, etc. Metadata embedded in the LAS or PLY output file can facilitate integration of the map with various third-party tools. In various embodiments, the map may be output in various file formats (e.g., .las file or .ply file) depending on user preferences.

In some embodiments, the post-processing application 130 may further generate representation data of the raw or post-processed mapping data or scanning data, which provides a preview of the raw or post-processed mapping data to be visualized though the visualization application 128 on the mobile device 110. For example, the post-processing application 130 may generate two-dimensional image data for three-dimensional point cloud data obtained from a LiDAR scanning sensor. The original three-dimensional point cloud data may be raw point cloud data obtained from the payload 124 or point cloud data that has been processed by the post-processing application 130. In embodiments, the representation data may be in image file formats, such as JPEG, GIF, PNG, TIFF, BMP files, etc., and the mapping data may be in point cloud file formats, such as LAS or PLY files, etc. In other embodiments, the representation data may in other compressed file formats that is smaller than the standard point cloud file formats. For example, the representation data is generated by selecting a portion of the 3D mapping data or downsampling the 3D mapping data for compression. The generated representation data may be stored in a different file, or inserted into the original point cloud data at a start position to provide a preview of the original point cloud data. For instance, the representation data may be inserted at a middle point of the point cloud data or appended at a tail section of the point cloud data, and thus, a combined point cloud data (including the original point cloud data and its representation data) may be generated.

The representation data is generated to provide faster and efficient rendering on the visualization application 128 because the representation data has a much smaller file size (e.g., in megabytes) than the mapping data (e.g., in gigabytes). The representation data that is generated based on the present disclosure ensures the preview image pertains sufficient information of the mapping data. Therefore, it allows a user to easily identify a specific mapping mission from a plurality of mapping missions by image visualization, rather than to sort through all the mapping missions by opening the point cloud files one-by-one. Detailed descriptions regarding methods for generating the representation data will be discussed below.

In some embodiments, the post-processing application 130 may further generate metadata for the inserted representation data. The metadata may include information, such as the start position, the end position, or a length/size of the inserted representation data. In embodiments, the metadata may also be inserted into the point cloud data, such as inserted at a header section of the point cloud data. When rendering, the visualization application 128 may only read the header section of the combined point cloud data to obtain the metadata, which points or directs the visualization application 128 to the start position of the representation data. Instead of reading through the whole combine point cloud data to find the representation data for rendering, only reading the header section efficiently shortens the process time for rendering the preview image. Further, by way of inserting the representation data and/or metadata of the representation data into a point cloud data having a standard file format (e.g., LAS or PLY files), the data format of the combined point cloud data will be the same as the point cloud data prior to data insertion. Therefore, the combined point cloud data is recognizable by point cloud visualization application/service/browser provided online or off-line by any third party provider.

Additional details of the movable object architecture are described below with respect to FIG. 2.

Figure 2:
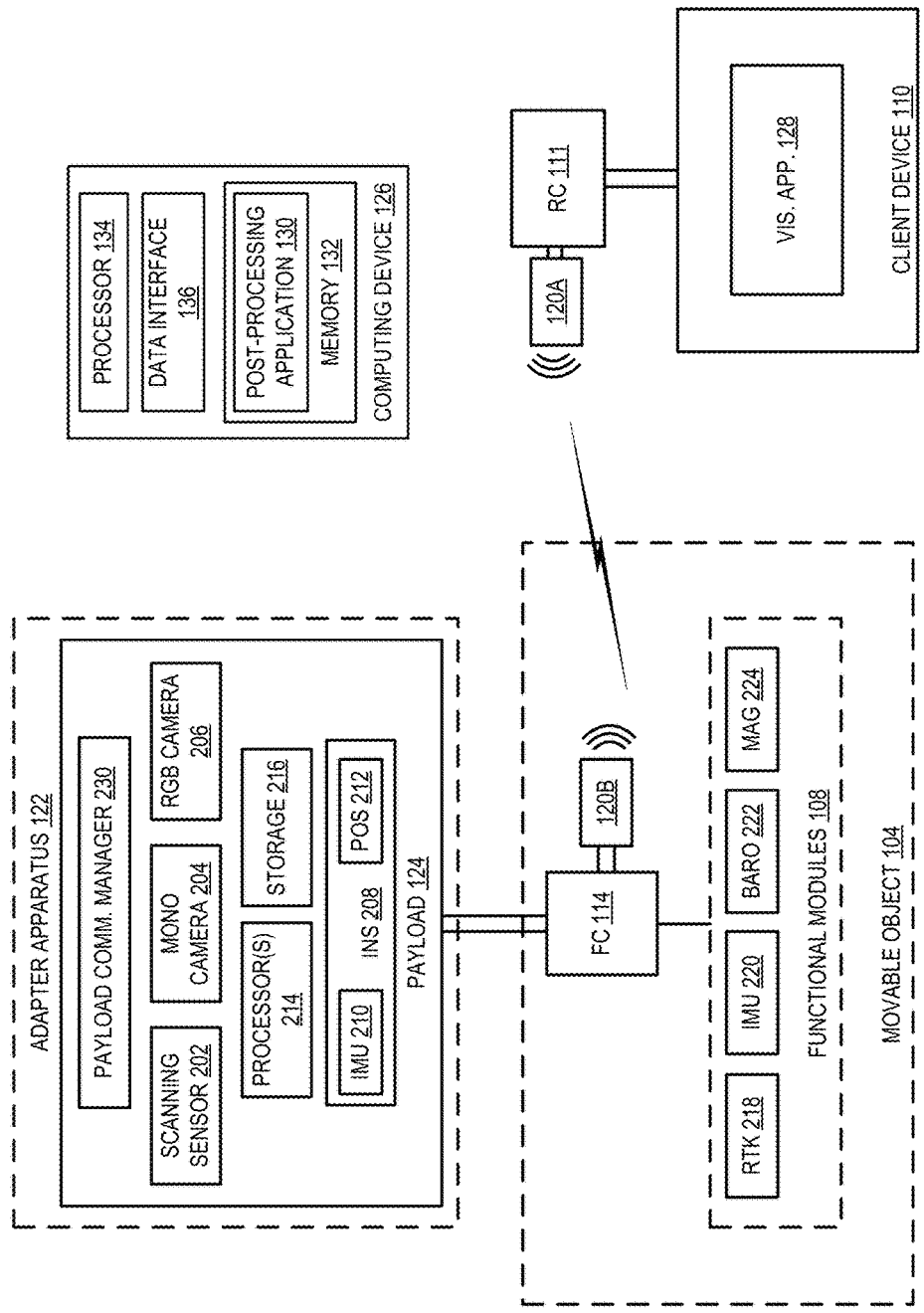
FIG. 2 illustrates an example of a movable object architecture in a movable object environment, in accordance with various embodiments.

FIG. 2 illustrates an example 200 of a movable object architecture in a movable object environment, in accordance with various embodiments. As shown in FIG. 2, a movable object 104 can include a flight controller 114 that communicates with payload 124 via adapter apparatus 122. Additionally, the flight controller can communicate with various functional modules 108 onboard the movable object. As discussed further below, the adapter apparatus 122 can facilitate communication between the flight controller and the payload via a high bandwidth connection, such as Ethernet or universal serial bus (USB). The adapter apparatus 122 can further provide power to the payload 124.

As shown in FIG. 2, the payload may include a plurality of sensors, including a scanning sensor 202, a monocular camera 204, an RGB camera 206, an inertial navigation system 208 which may include an inertial measurement unit 210 and a positioning sensor 212, one or more processors 214, and one or more storage devices 216. For example, scanning sensor 202 may include a LiDAR sensor. The LiDAR sensor may provide high resolution scanning data of a target environment. Various LiDAR sensors may be incorporated into the payload, having various characteristics. For example, the LiDAR sensor may have a field of view of approximately 70 degrees and may implement various scanning patterns, such as a seesaw pattern, an elliptical pattern, a petal pattern, etc. In some embodiments, a lower density LiDAR sensor can be used in the payload, as higher density point clouds require additional processing time. In some embodiments, the payload may implement its components on a single embedded board. The payload may further provide thermal management for the components.

The payload may further include a greyscale monocular camera 204. The monocular camera 204 may include a mechanical shutter that is synchronized with the inertial navigation system (INS) 208 such that when an image is captured by the monocular camera, the attitude of the payload at that moment is associated with the image data. This enables visual features (walls, corners, points etc.) to be extracted from image data captured by the monocular camera 204. For example, the visual features that are extracted can be associated with a pose-timestamp signature that is generated from the attitude data produced by the INS. Using the pose-timestamped feature data, visual features can be tracked from one frame to another, which enables a trajectory of the payload (and as a result, the movable object) to be generated. This allows for navigation in areas with limited signal from satellite-based positioning sensors, such as indoors or when RTK data is weak or otherwise unavailable. In some embodiments, the payload may further include an RGB camera 206. The RGB camera can collect live image data that is streamed to the client device 110 while the movable object is in flight. For example, the user can select whether to view image data collected by one or more cameras of the movable object or the RGB camera of the payload through a user interface of the client device 110. Additionally, color data can be obtained from image data collected by the RGB camera and overlaid on the point cloud data collected by the scanning sensor. This provides improved visualizations of the point cloud data that more closely resemble the actual objects in the target environment being scanned.

As shown in FIG. 2, the payload can further include an inertial navigation system 208. The INS 208 can include an inertial measurement unit 210 and optionally a positioning sensor 212. The IMU 210 provides the attitude of the payload which can be associated with the scanning data and image data captured by the scanning sensor and cameras, respectively. The positioning sensor 212 may use a global navigation satellite service, such as GPS, GLOSNASS, Galileo, BeiDou, etc. In some embodiments, the positioning data collected by the positioning sensor 212 may be enhanced using an RTK module 218 onboard the movable object to enhance positioning data collected by INS 208. In some embodiments, RTK information can be received wirelessly from one or more base stations. The antenna of the RTK module 218 and the payload are separated by a fixed distance on the movable object, allowing the RTK data collected by the RTK module 218 to be transformed into the IMU frame of the payload. Alternatively, the payload 124 may not include its own positioning sensor 212 and instead may rely on a positioning sensor and RTK module 218 of the movable object, e.g., included in functional modules 108. For example, positioning data may be obtained from the RTK module 218 of the movable object 104 and may be combined with the IMU data. The positioning data obtained from the RTK module 218 can be transformed based on the known distance between the RTK antenna and the payload.

As shown in FIG. 2, the payload can include one or more processors 214. The one or more processors may include an embedded processor that includes a CPU and DSP as an accelerator. In some embodiments, other processors may be used such as GPUs, FPGAs, etc. In some embodiments, the processor 214 can geo-reference the scanning data using the INS data. In some embodiments, the geo-referenced scanning data is downsampled to a lower resolution before being sent to the client device 110 for visualization. In some embodiments, payload communication manager 230 can manage downsampling and other data settings for a plurality of mobile devices that connect to the payload. In some embodiments, different mobile devices may be associated with preference data maintained by the payload communication manager 230, where the preference data indicates how the mapping data is to be prepared and/or sent to that mobile device. For example, communication protocol settings, channel settings, encryption settings, transfer rate, downsampling settings, etc.

In some embodiments, the processor(s) 214 can also manage storage of the sensor data to one or more storage devices 216. The storage device(s) can include a secure digital (SD) card or other removable media, a solid-state drive (SSD), an eMMC, and/or a memory. In some embodiments, the processor can also be used to perform visual inertial odometry (VIO) using the image data collected by the monocular camera 204. This may be performed in real-time to calculate the visual features which are then stored in a storable format (not necessarily as images). In some embodiments, log data may be stored to an eMMC and debugging data can be stored to an SSD. In some embodiments, the processor(s) can include an encoder/decoder built in for processing image data captured by the RGB camera.

The flight controller 114 can send and receive data to and from the remote control via communication system 120B. Flight controller 114 can connect to various functional modules 108, such as RTK module 218, IMU 220, barometer 222, or magnetometer 224. In some embodiments, communication system 120B can connect to other computing devices instead of, or in addition to, flight controller 114. In some embodiments, sensor data collected by the one or more functional modules 108 can be passed from the flight controller 114 to the payload 124.

During a mapping mission, the user can receive data from, and provide commands to, the UAV using a visualization application 128 on client device 110. The visualization application 128 can display a visualization of the mapping that has been performed so far. For example, the post-processing application 130 of the computing device 126 (located onboard at the payload 124 or the movable object 104, or located off-board at the client device 110) can process the mapping data as it is received through the data interface 136. This can include geo-referencing the scanning data and the image data using the positioning data, and then downsampling the resulting geo-referenced mapping data. When the computing device 126 is onboard at the payload 124 or the movable object 104, the down-sampled data can be wirelessly transmitted to the visualization application 128 using communication system 120B via flight controller 114. When the computing device 126 is off-board at the client device 110, the down-sampled data can be transmitted to the visualization application 128 directly. The real-time visualization application 128 can then display a visual representation of the down-sampled data. This enables a user to visualize how much and/or what portions of a target environment have been scanned to determine what portions still need to be scanned, etc.

Once a mapping mission is complete and the UAV has returned home, the mapping data collected and processed by the payload can be obtained from the removable storage medium on the payload or on the UAV. The removable media can be provided to a computing device 126 where it is read by a data interface 136. For example, where the removable media is an SD card, the data interface 136 may be a card reader. The computing device 126 can include a mapping application 128 to visualize mapping data and a post-processing application 130 to process the raw mapping data into a form that can be visualized. In some embodiments, the post-processing application 130 can be optimized for processing data from the scanning sensor of the payload. Because the payload includes a single scanning sensor having fixed characteristics, the post-processing application 130 can be optimized for those characteristics, such as scanning density, etc. Post-processing may include high precision post processing which is performed on higher density georeferenced mapping data as compared to the online processing. Additionally, the positioning data may be of higher quality as there is no need to process the INS data in real-time. In some embodiments, high precision post processing can also make use of more complex and longer running time optimization algorithms such as G2O.

In some embodiments, post-processing may include receiving the geo-referenced point cloud data and the payload pose data and constructing a plurality of local maps. In some embodiments, the local maps may be constructed using an iterative closest matching (ICP) module or other module implementing a matching algorithm. In various embodiments, rather than first extracting features from the scans and using these features to match the scans and build the local maps, the ICP module can operate directly on the point cloud data, improving accuracy and reducing processing times. The local maps can then be analyzed to identify correspondence points. The correspondence points include a point in space that has been scanned multiple times from multiple poses. The correspondence points can be used to construct a pose graph. In some embodiments, the ICP module can identify correspondence points in the local maps using the ICP algorithm. Rather than using the approaches of computing feature points (for example the point feature histograms (PFH), fast point feature histograms (FPFH), 3D scale invariant feature transform (SIFT) feature point or other feature extraction techniques) and then estimating correspondence that are adopted by many point cloud matching techniques, embodiments use ICP to directly determine correspondence without computing human crafted features (e.g., PFH, FPFH, 3D SIFT, etc.). This also avoids potential error that is introduced during the process of abstracting feature information. Graph optimization techniques can then be used to optimize the pose graph to create the optimized point cloud data. The resulting optimized point cloud data can then be viewed on the post-processing application 130 or visualization application 128.

In some embodiments, the post-processing application 130 may further generate representation data of the raw or post-processed mapping data or scanning data, which provides a preview of the raw or post-processed mapping data to be visualized though the visualization application 128 on the mobile device 110. For example, the post-processing application 130 may generate two-dimensional image data for three-dimensional point cloud data obtained from a LiDAR scanning sensor. The original three-dimensional point cloud data may be raw point cloud data obtained through the data interface 136 or point cloud data that has been processed by the post-processing application 130. In embodiments, the representation data may be in image file formats, such as JPEG, GIF, PNG, TIFF, BMP files, etc., and the mapping data may be in point cloud file formats, such as LAS or PLY files, etc. In other embodiments, the representation data may in other compressed file formats that is smaller than the standard point cloud file formats. For example, the representation data is generated by selecting a portion of the 3D mapping data or downsampling the 3D mapping data for compression. The generated representation data may be stored in a different file, or inserted into the original point cloud data at a start position to provide a preview of the original point cloud data. For instance, the representation data may be inserted at a middle point of the point cloud data or appended at a tail section of the point cloud data, and thus, a combined point cloud data (including the original point cloud data and its representation data) may be generated.

The representation data is generated to provide faster and efficient rendering on the visualization application 128 because the representation data has a much smaller file size (e.g., in megabytes) than the mapping data (e.g., in gigabytes). The representation data that is generated based on the present disclosure ensures the preview image pertains sufficient information of the mapping data. Therefore, it allows a user to easily identify a specific mapping mission from a plurality of mapping missions by image visualization, rather than to sort through all the mapping missions by opening the point cloud files one-by-one. Detailed descriptions regarding methods for generating the representation data will be discussed below.

In some embodiments, the post-processing application 130 may further generate metadata for the inserted representation data. The metadata may include information, such as the start position, the end position, or a length/size of the inserted representation data. In embodiments, the metadata may also be inserted into the point cloud data, such as inserted at a header section of the point cloud data. When rendering, the visualization application 128 may only read the header section of the combined point cloud data to obtain the metadata, which points to or directs the visualization application 128 to the start position of the representation data. Instead of reading through the whole combine point cloud data to find the representation data for rendering, only reading the header section efficiently shortens the process time for rendering the preview image. Further, by way of inserting the representation data and/or metadata of the representation data into a point cloud data having a standard file format (e.g., LAS or PLY files), the data format of the combined point cloud data will be the same as the point cloud data prior to data insertion. Therefore, the combined point cloud data is recognizable by point cloud visualization application/service/browser provided online or off-line by any third party provider.

Figure 3:
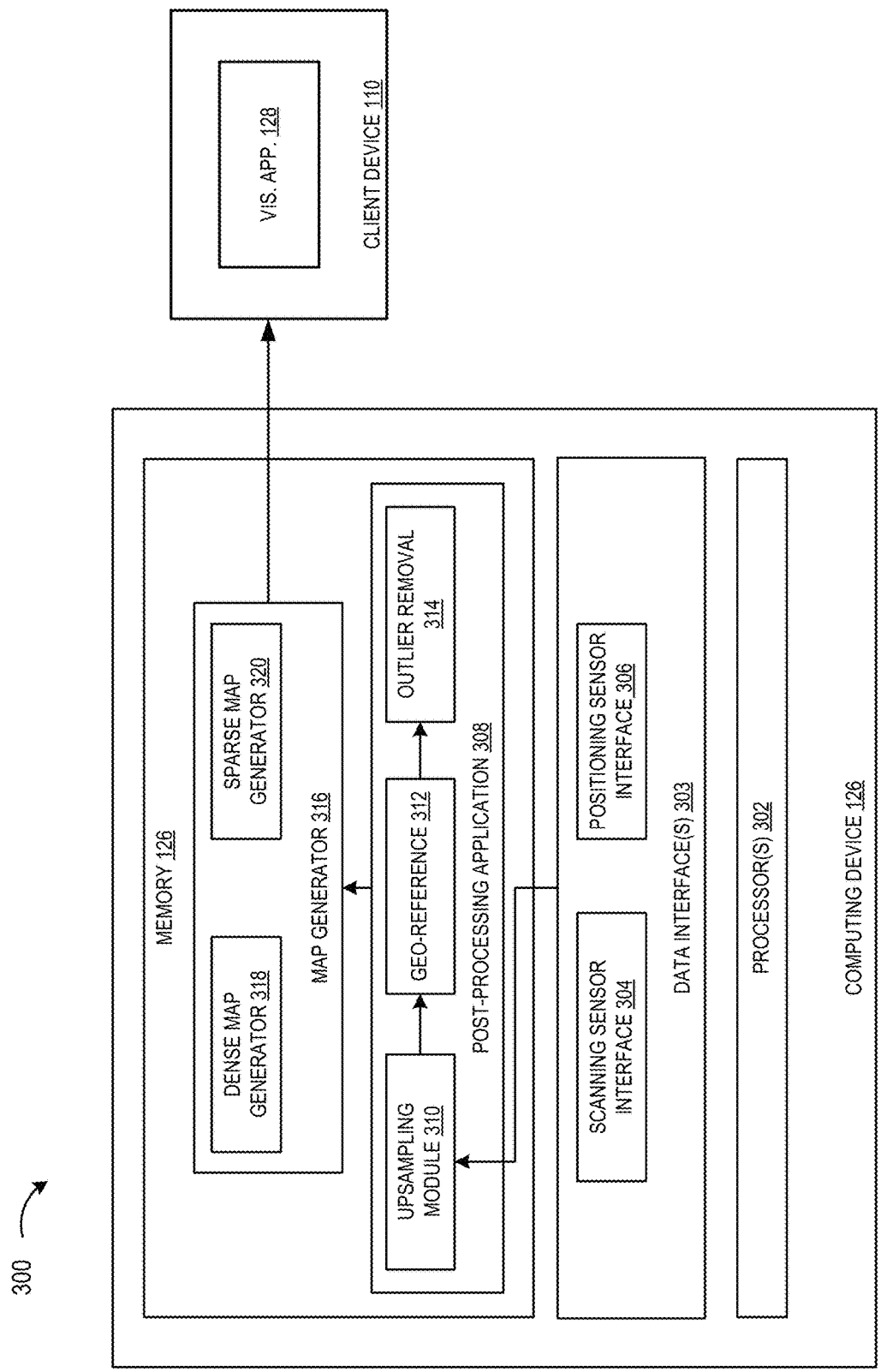
FIG. 3 illustrates an example of computing device and client device architectures, in accordance with various embodiments.

FIG. 3 illustrates an example 300 of a computing device 126 and a mobile device 110 architectures in a movable object environment, in accordance with various embodiments. As shown in FIG. 3, a computing device 126 may execute on one or more processors 302 of computing device 126. As discussed above, in some embodiments, the computing device 126 can be disposed onboard the movable object 104, such as at the payload 124 or within the movable object 104. In other embodiments, the computing device 126 may be disposed off-board the movable object 104, such as at a ground terminal, the remote control 111, the client device 110, or other remote terminals. The one or more processors 302 may include CPUs, GPUs, FGPAs, SoCs, or other processors, and may be part of a parallel computing architecture implemented by computing device 126. The computing device 126 may include data interfaces 303, post-processing application 308, and map generator 316.

Data interfaces 303 can include a scanning sensor interface 304 and a positioning sensor interface 306. The sensor interfaces 303 may include hardware and/or software interfaces. The scanning sensor interface 304 can receive data from the scanning sensor (e.g., a LiDAR or other scanning sensor) and the positioning sensor interface 306 can receive data from the positioning sensor (e.g., a GPS sensor, an RTK sensor, an IMU sensor, and/or other positioning sensors or a combination thereof). In various embodiments, the scanning sensor may produce mapping data in a point cloud format (e.g., LAS or PLY files). The point cloud of the mapping data may be a three-dimensional representation of the target environment. In some embodiments, the point cloud of the mapping data may be converted to a matrix representation. The positioning data may include GPS coordinates for the movable object and, in some embodiments, may include roll, pitch, and yaw values associated with the movable object corresponding to each GPS coordinate. The roll, pitch, and yaw values may be obtained from the positioning sensor, such as an inertial measurement unit (IMU), or other sensor. As discussed, the positioning data may be obtained from an RTK module, which corrects the GPS coordinates based on a correction signal received from a reference station. In some embodiments, the RTK module may produce a variance value associated with each output coordinate. The variance value may represent the accuracy of the corresponding positioning data. For example, if the movable object is performing sharp movements, the variance value may go up, indicating less accurate positioning data has been collected. The variance value may also vary depending on atmospheric conditions, leading to different accuracies measured by the movable object depending on the particular conditions present when the data was collected.

The positioning sensor and the scanning sensor may be synchronized using a time synchronization mechanism. For example, the positioning sensor and scanning sensor may share clock circuitry. In some embodiments, the positioning sensor may include clock circuitry and output a clock signal to the scanning sensor. In some embodiments, a separate clock circuit may output a clock signal to both the scanning sensor and the positioning sensor. As such, the positioning data and the mapping data may be time-stamped using the shared clock signal.

In some embodiments, the positioning sensor and scanning sensor may output data with differing delays. For example, the positioning sensor and the scanning sensor may not start generating data at the same time. As such, the positioning data and/or mapping data may be buffered to account for the delay. In some embodiments, a buffer size may be chosen based on the delay between the output of each sensor. In some embodiments, a post-processing application 308 can receive the data from the positioning sensor and scanning sensor and generate synchronized data using the timestamps shared by the sensor data with respect to the shared clock signal. This enables the positioning data and mapping data to be synchronized for further processing.

Additionally, the frequency of the data obtained from each sensor may be different. For example, the scanning sensor may be producing data in the range of hundreds of kHz, while the positioning sensor may be producing data in the range of hundreds of Hz. Accordingly, to ensure each point of the mapping data has corresponding positioning data, upsampling module 310 can interpolate the lower frequency data to match the higher frequency data. For example, assuming the positioning data is produced by the positioning sensor at 100 Hz and the mapping data is produced by the scanning sensor (e.g., a LiDAR sensor) at 100 kHz, the positioning data may be upsampled from 100 Hz to 100 kHz. Various upsampling techniques may be used to upsample the positioning data. For example, a linear fit algorithm, such as least squares, may be used. In some embodiments, non-linear fit algorithms may be used to upsample the positioning data. Additionally, the roll, pitch, yaw values of the positioning data may also be interpolated to match the frequency of the mapping data. In some embodiments, the roll, pitch, and yaw values may be spherical linear interpolated (SLERP) to match the number of points in the mapping data. The time stamps may likewise be interpolated to match the interpolated positioning data.

Once the positioning data has been upsampled and synchronized with the mapping data by upsampling module 310, geo-reference module 312 can convert the matrix representation of the mapping data from the frame of reference (or the reference coordinate system) in which it was collected (e.g., scanner reference frame or scanner reference coordinate system) to a desired frame of reference (or a desired reference coordinate system). For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

Each point in the point cloud of the mapping data is associated with a position in the scanner reference frame that is determined relative to the scanning sensor. The positioning data of the movable object, produced by the positioning sensor, may then be used to convert this position in the scanner reference frame to the output reference frame in a world coordinate system, such as a GPS coordinate system. For example, the position of the scanning sensor in the world coordinate system is known based on the positioning data. In some embodiments, the positioning sensor and the scanning module may be offset (e.g., due to being located at different positions on the movable object). In such embodiments, a further correction factoring in this offset may be used to convert from the scanner reference frame to the output reference frame (e.g., each measured position in the positioning data may be corrected using the offset between the positioning sensor and the scanning sensor). For each point in the point cloud of the mapping data, the corresponding positioning data can be identified using the time stamp. The point can then be converted to the new reference frame. In some embodiments, the scanner reference frame can be converted into a horizontal reference frame using the interpolated roll, pitch, and yaw values from the positioning data. Once the mapping data has been converted into the horizontal reference frame, it may be further converted into a Cartesian frame or other output reference frame. Once each point has been converted, the result is a geo-referenced point cloud, with each point in the point cloud now referenced to the world coordinate system. In some embodiments, the geo-referenced point cloud can be provided to map generator 316 before performing outlier removal to remove outlier data from the geo-reference point cloud.

After the geo-referenced point cloud has been produced, outlier removal module 314 can remove outlier data from the geo-referenced point cloud. In some embodiments, the geo-referenced point cloud may be downsampled, reducing the number of outliers in the data. Downsampling of this data may be performed using voxels. In some embodiments, the points in each voxel may be averaged, and one or more averaged points may be output per voxel. As such, outlier points will be removed from the data set in the course of averaging the points in each voxel. In various embodiments, the resolution of the voxels (e.g., the size of each voxel), may be arbitrarily defined. This allows for sparse and dense downsampled point clouds to be produced. The resolution may be determined by the user, or by the mapping manager based on, e.g., available computing resources, user preferences, default values, or other application-specific information. For example, a lower resolution (e.g., larger voxel size) may be used to produce a sparse downsampled point cloud for visualization on a client device or a mobile device. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. In some embodiments, the outlier removal technique may be selectable by the user or be automatically selected by the post-processing application. In some embodiments, outlier removal may be disabled.

As discussed, the point cloud data may be a three-dimensional representation of the target environment. This 3D representation can be divided into voxels (e.g., 3D pixels).

After statistical outlier removal, the resulting point cloud data can be provided to map generator 316. In some embodiments, the map generator 316 may include a dense map generator 318 and/or a sparse map generator 320. In such embodiments, dense map generator 318 can produce a high-density map from the point cloud data received before outlier removal, and sparse map generator 320 can produce a low-density map from the sparse downsampled point cloud data received after outlier removal. In other embodiments, dense map generator 318 and sparse map generator 320 may produce a high-density map and a low-density map separately from the point cloud received both after outlier removal. In such embodiments, each map generator may generate the output map using the same process but may vary the size of the voxels to produce high-density or low-density maps. In some embodiments, the low-density map can be used by a client device 110 or a mobile device to provide visualization of the mapping data. The high-density map can be output as a LIDAR Data Exchange File (LAS) or other file type (such as PLY file) to be used with various mapping, planning, analysis, or other tools or to be rendered on the mobile device 110 through the visualization application 128.

The map generator 316 may use the point cloud data to perform a probabilistic estimation of the position of points in the map. For example, the map generator may use a 3D mapping library, such as OctoMap to produce the output map. The map generator can divide the point cloud data into voxels. For each voxel, the map generator can determine how many points are in the voxel and, based on the number of points and the variance associated with each point, determine the probability that a point is in that voxel. The probability may be compared to an occupancy threshold and, if the probability is greater than the occupancy threshold, a point may be represented in that voxel in the output map. In some embodiments, the probability that a given voxel is occupied can be represented as:

$$P(n \mid z_{1:t}) = \left[1 + \frac{1-P(n \mid z_t)}{P(n \mid z_t)} \frac{1-P(n \mid z_{1:t-1})}{P(n \mid z_{1:t-1})} \frac{P(n)}{1-P(n)}\right]^{-1}$$

The probability $P(n|z_{1:t})$ of a node n being occupied is a function of the current measurement $z_1$, a prior probability $P(n)$, and the previous estimate $P(n|z_{1:t-1})$. Additionally, $P(n|z_t)$ represents the probability that voxel n is occupied given the measurement $z_t$. This probability may be augmented to include the variance of each point, as measured by the positioning sensor, as represented by the following equations:

$$P(n) = \frac{1}{2}P_x(x, \mu_x, \sigma_x^2)P_y(y, \mu_y, \sigma_y^2)P_z(z, \mu_Z, \sigma_z^2) + \frac{1}{2}$$

$$P(n, \mu, \sigma^2) = \frac{1}{\sqrt{2\pi\sigma^2}}e^{-\frac{(x-\mu)^2}{2\sigma^2}}$$

In the equations above, P(n) represents the total probability that a voxel n is occupied. The use of ½ in the above equation is implementation specific, such that the probability is mapped to a range of ½-1. This range may vary, depending on the particular implementation in use. In the above equations, the total probability is the product of probabilities calculated for the x, y, and z dimensions. The probability in each dimension may be determined based on the mean, μ, for each point in that dimension, and the variance, $\sigma^2$, of each measurement in a given dimension, with x, y, and z corresponding to the coordinate values of a given point. A large number of points near the mean point in a given voxel may increase the probability, while a more diffuse collection of points in the voxel may lower the probability. Likewise, a large variance associated with the data (e.g., indicating lower accuracy position data has been collected) may lower the probability while a lower variance may increase the probability. P(n, μ, $\sigma^2$) represents the Gaussian distribution for the voxel, given the mean and variance values of the points in that voxel.

If the total probability of a voxel being occupied is greater than a threshold occupancy value, then a point can be added to that voxel. In some embodiments, all of the points in that voxel can be averaged, and the resulting mean coordinate can be used as the location of the point in that voxel. This improves the accuracy of the resulting map over alternative methods, such as using the center point of an occupied voxel as the point, which may result in skewed results depending on the resolution of the voxels. In various embodiments, the occupancy threshold can be set based on the amount of processing resources available and/or based on the acceptable amount of noise in the data for a given application. For example, the occupancy threshold can be set to a default value of 70%. A higher threshold can be set to reduce noise. Additionally, the occupancy threshold may be set depending on the quality of the data being collected. For example, data collected under one set of conditions may be high quality (e.g., low variance) and a lower occupancy threshold can be set, while lower quality data may necessitate a higher occupancy threshold.

The resulting map data, with one point in each occupied voxel, can then be output as an LAS file, or other file format (such as PLY file). In some embodiments, the geo-referenced point cloud data may be output without additional processing (e.g., outlier removal). In some embodiments, each point in the point cloud data may also be associated with an intensity value. The intensity value may represent various features of the object being scanned, such as elevation above a reference plane, material composition, etc. The intensity value for each point in the output map may be an average of the intensity values measured for each point in the mapping data collected by the scanning sensor (e.g., a LiDAR sensor).

In embodiments, the post-processing application 308 may generate two-dimensional representation data of the high-density or low-density (downsampled after the outlier removal) three-dimensional mapping data. The 2D representation data provides a preview image of the 3D mapping data. In some embodiments, the representation data is generated by projecting the 3D mapping data onto a 2D projecting plane based on a perspective of view the 3D mapping data. The perspective of view for projection can be a top view, a side view, or a view that includes a largest number of feature points that captures the most features of the map. After the representation data is generated, the post-processing application 308 may further insert the representation data into the original 3D mapping data to obtain a combined mapping data without changing the standard file format of the 3D mapping data. For instance, the representation data may be appended at a tail or at a middle position of the original mapping data. The data insertion may be conducted based on the specific file format (such as LAS or PLY file) of the 3D mapping data.

The post-processing application 308 may further generate metadata for the inserted representation data. The metadata provides additional information of the inserted representation data added to the 3D mapping data, such as a start position, an end position, and/or a length or size of the inserted representation data. After the metadata of the representation data is generated, it may also be inserted into the combined mapping data, such as by inserting into a header of the original 3D mapping data. In embodiments, the combined mapping data which includes the inserted representation data and the inserted metadata may be communicated to the mobile device 110 for displaying via the visualization application 128. The representation data provides a small-sized preview image (usually in megabytes) of the large-sized 3D mapping data (usually in gigabytes) that is can be easily browsed by the user of the mobile device 110. The metadata may serve as a pointer that directs to the exact position of the representation data in the combined mapping data to be visualized through the visualization application 128 on the mobile device 110.

Figure 4:
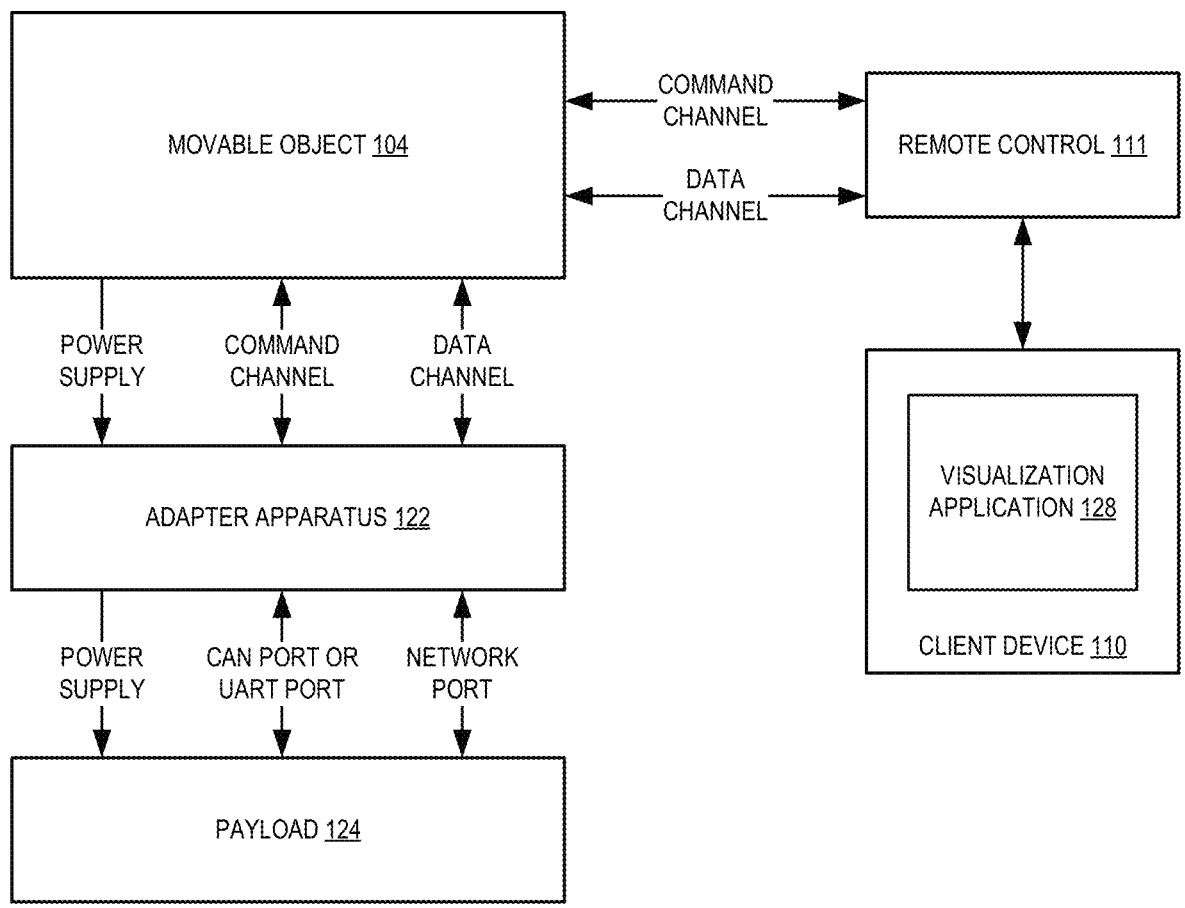
FIG. 4 illustrates an example of an adapter apparatus in a movable object environment, in accordance with various embodiments.

FIG. 4 illustrates an example of an adapter apparatus in a movable object environment, in accordance with various embodiments. As shown in FIG. 4, an adapter apparatus 122 enables a payload 124 to be connected to a movable object 104. In some embodiments, the adapter apparatus 122 is a Payload Software Development Kit (SDK) adapter plate, an adapter ring and the like. The payload 124 can be connected to the adapter apparatus 122, and the adapter apparatus can be coupled with the fuselage of the movable object 104. In some embodiments, adapter apparatus may include a quick release connector to which the payload can be attached/detached.

When the payload 124 is connected to the movable object 104 through the adapter apparatus 122, the payload 124 can also be controlled by a client device 110 via a remote control 111. As shown in FIG. 4, the remote control 111 and/or visualization application 128 can send a control instruction through a command channel between the remote control and the communication system of the movable object 104. The control instruction can be transmitted to control the movable object 104 and/or the payload 124. For example, the control instruction may be used for controlling the attitude of the payload, to selectively view live data being collected by the payload (e.g., real-time low density mapping data, image data, etc.) on the mobile device, etc.

As shown in FIG. 4, after the communication system of the movable object 104 receives the control instruction, the control instruction is sent to the adapter apparatus 122, the communication protocol between the communication system and the adapter apparatus of the movable object is may be referred to as an internal protocol, and the communication protocol between the adapter apparatus and the payload 124 may be referred to as an external protocol. In an embodiment, an internal protocol between the communication system of the movable object 104 and the adapter apparatus 122 is recorded as an internal communication protocol, and an external protocol between the adapter apparatus 122 and the payload 124 is recorded as an external communication protocol. After the communication system of the movable object receives the control instruction, the internal communication protocol is adopted to send the control instruction to the adapter apparatus through a command channel between the communication system and the adapter apparatus.

When the adapter apparatus receives the control instruction sent by the movable object using the internal communication protocol, the internal protocol between the communication system of the movable object and the adapter apparatus is converted into an external protocol between the adapter apparatus and the payload 124. In some embodiments, the internal protocol can be converted into the external protocol by the adapter apparatus by adding a header conforming to the external protocol in the outer layer of the internal protocol message, so that the internal protocol message is converted into an external protocol message.

As shown in FIG. 4, the communication interface between the adapter apparatus and the payload 124 may include a Controller Area Network (CAN) interface or a Universal Asynchronous Receiver/Transmitter (UART) interface. After the adapter apparatus converts the internal protocol between the communication system of the movable object and the adapter apparatus into an external protocol between the adapter apparatus and the payload 124, the control instruction is sent to the payload 124 through the CAN interface or the UART interface by using an external protocol.

As discussed, the payload 124 can collect sensor data from a plurality of sensors incorporated into the payload, such as a LiDAR sensor, one or more cameras, an INS, etc. The payload 124 can send sensor data to the adapter apparatus through a network port between the payload 124 and the adapter apparatus. Alternatively, the payload 124 may also send sensor data through a CAN interface or a UART interface between the payload 124 and the adapter apparatus. Optionally, the payload 124 sends the sensor data to the adapter apparatus through the network port, the CAN interface or the UART interface using the external communication protocol.

After the adapter apparatus receives the sensor data from the payload 124, the adapter apparatus converts the external protocol between the adapter apparatus and the payload 124 into an internal protocol between the communication system of the movable object 104 and the adapter apparatus. In some embodiments, the adapter apparatus uses an internal protocol to send sensor data to a communication system of the movable object through a data channel between the adapter apparatus and the movable object. Further, the communication system sends the sensor data to the remote control 111 through the data channel between the movable object and the remote control 111, and the remote control 111 forwards the sensor data to the client device 110.

After the adapter apparatus receives the sensor data sent by the payload 124, the sensor data can be encrypted to obtain encrypted data. Further, the adapter apparatus uses the internal protocol to send the encrypted data to the communication system of the movable object through the data channel between the adapter apparatus and the movable object, the communication system sends the encrypted data to the remote control 111 through the data channel between the movable object and the remote control 111, and the remote control 111 forwards the encrypted data to the client device 110.

In some embodiments, the payload 124 can be mounted on the movable object through the adapter apparatus 122. When the adapter apparatus 122 receives the control instruction for controlling the payload 124 sent by the movable object 104, the internal protocol between the movable object and the adapter apparatus is converted into an external protocol between the adapter apparatus 122 and the payload 124, and the control instruction is sent to the payload 124 by adopting an external protocol, so that the third-party device produced by the third-party manufacturer can communicate with the movable object normally through the external protocol, so that the movable object can support the third-party device, and the application range of the movable object is improved.

In some embodiments, to facilitate communication with the payload, the adapter apparatus 122 sends a handshake instruction to the payload 124, and the handshake instruction is used for detecting whether the adapter apparatus 122 and the payload 124 are in normal communication connection or not. In some embodiments, the adapter apparatus 122 can also send a handshake instruction to the payload 124 periodically or at arbitrary times. If the payload 124 does not answer, or the response message of the payload 124 is wrong, the adapter apparatus 122 can disconnect the communication connection with the payload 124, or the adapter apparatus 122 can limit the functions available to the payload.

The adapter apparatus 122 may also comprise a power interface, and the power interface is used for supplying power to the payload 124. As shown in FIG. 4, the movable object 104 can supply power to the adapter apparatus 122, the adapter apparatus 122 can further supply power to the payload 124, the adapter apparatus may include a power interface through which the adapter apparatus 122 supplies power to the payload 124. In various embodiments, the communication interface between the movable object 104 and the adapter apparatus 122 may include a Universal Serial Bus (USB) interface.

As shown in FIG. 4, the data channel between the communication system of the movable object 104 and the adapter apparatus 122 can be implemented using a USB interface. In some embodiments, the adapter apparatus 122 can convert the USB interface into a network port, such as an Ethernet port. The payload 124 can carry out data transmission with the adapter apparatus 122 through the network port, so that the payload 124 can conveniently use the transmission control protocol to communicate with the adapter apparatus 122 for network communication without requiring a USB driver.

In some embodiments, the interface externally output by the movable object 104 comprises a CAN port, a USB port and a 12V 4A power supply port. The CAN interface, the USB port and the 12V 4A power port are respectively connected with the adapter apparatus 122, the CAN port, the USB port and the 12V 4A power port are subjected to protocol conversion by the adapter apparatus 122, and a pair of external interfaces can be generated.

Figures 5A, 5B:
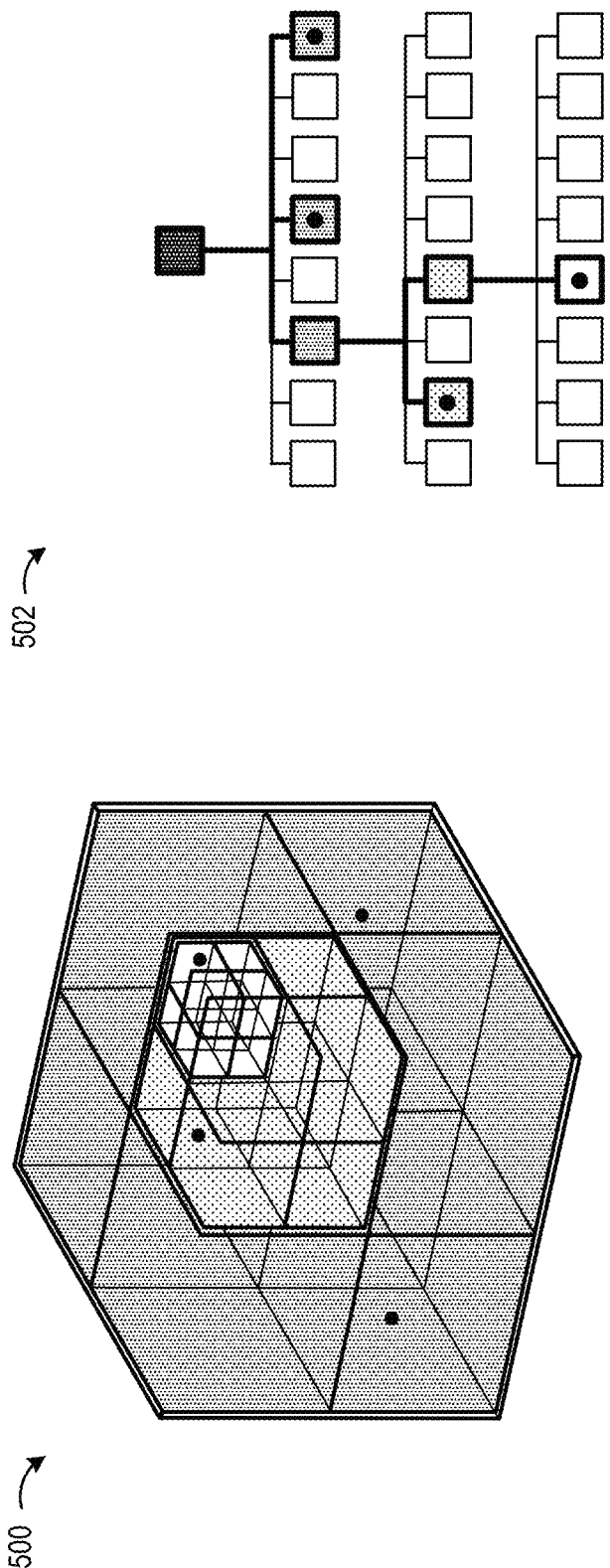
FIGS. 5A and 5B illustrates an example of a hierarchical data structure, in accordance with various embodiments, in accordance with various embodiments.

FIGS. 5A and 5B illustrates an example of a hierarchical data structure, in accordance with various embodiments, in accordance with various embodiments. As discussed above, and as shown in FIG. 5A, data representing a 3D environment 500 can be divided into a plurality of voxels. As shown in FIG. 5A, the target environment can be divided into eight voxels, with each voxel being further divided into eight sub-voxels, and each sub-voxel divided into eight further smaller sub-voxels. Each voxel may represent a different volumetric portion of the 3D environment. The voxels may be subdivided until a smallest voxel size is reached. The resulting 3D environment can be represented as a hierarchical data structure 502, where the root of the data structure represents the entire 3D environment, and each child node represents a different voxel in different hierarchy within the 3D environment.

Figure 6B:
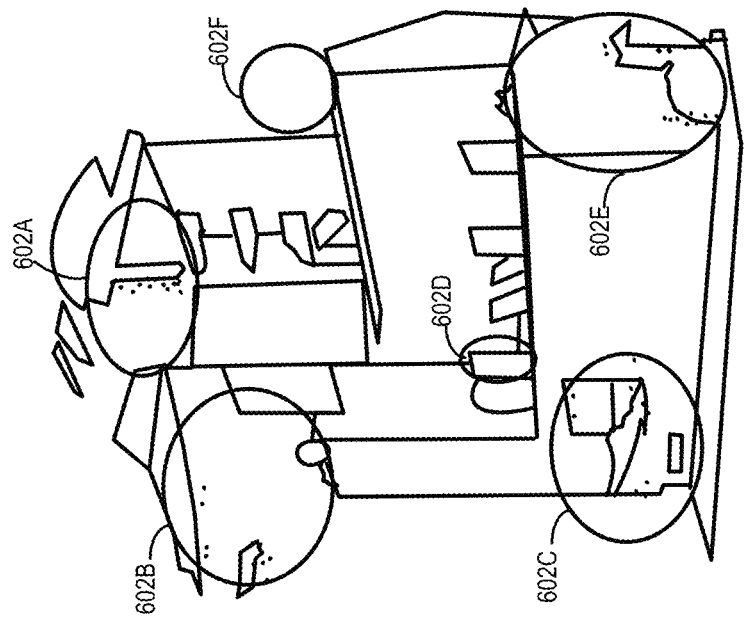
FIGS. 6A and 6B illustrate an example of outlier removal in mapping data, in accordance with various embodiments.
Figure 6A:
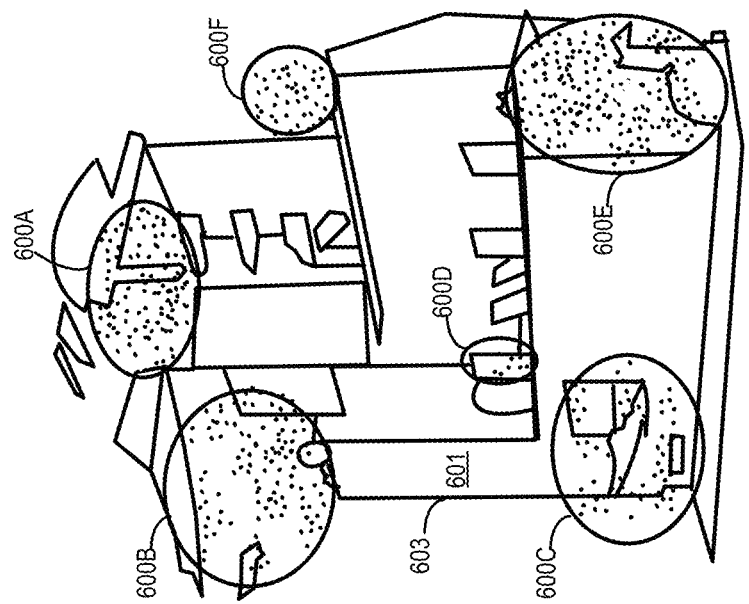

FIGS. 6A and 6B illustrate an example of outlier removal in mapping data, in accordance with various embodiments. As shown in FIG. 6A, when a target object is scanned, it may be represented as a plurality of points, with those points clustered on different parts of the object, including surfaces (such as surface 601), edges (such as edge 603), and other portions of the target object in the target environment. For simplicity of depiction, these surfaces, edges, etc. are shown solid. In various regions 600A-600F of the data, there are additional outlier points. This may be most noticeable in regions of empty space, as shown in FIG. 6A. These points are diffuse, as compared to the more densely packed points of the surfaces and edges of the target object. Outlier removal may be used to eliminate or reduce the number of these points in the data. As discussed above, the geo-referenced point cloud data may be downsampled, reducing the number of outliers in the data. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. As shown in FIG. 6B, following outlier removal, the regions of the point cloud data 602A-602F have been reduced, providing a cleaner 3D map.

Figure 7:
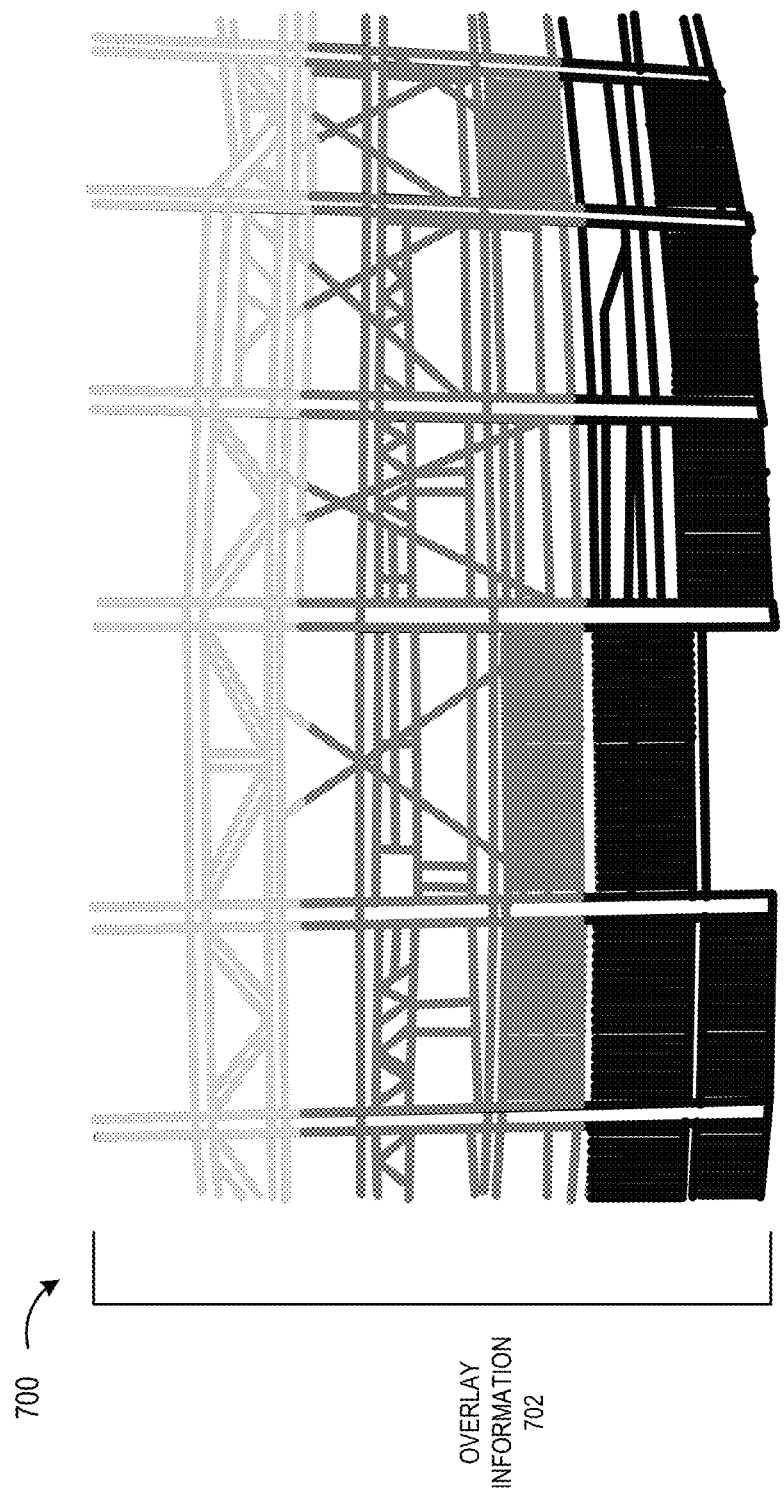
FIG. 7 illustrates an example of overlaying information in mapping data, in accordance with various embodiments.

FIG. 7 illustrates an example 700 of overlaying data values in mapping data, in accordance with various embodiments. As shown in FIG. 7, overlay information 702 can be obtained from the RGB camera or other sensors incorporated into the payload. For example, in some embodiments, the overlay data can include color data which may include pixel values of various color schemes (e.g., 16-bit, 32-bit, etc.). The color data can be extracted from one or more images captured by the RGB camera at the same time as the point cloud data was captured by the scanning sensor and these color values can be overlaid on the visualization of the point cloud data. Although depicted in FIG. 7 as grayscale, the color data may include various color values depending on the color values of the image data captured by the RGB camera. In some embodiments, the overlay data can include height above a reference plane. For example, a color value may be assigned to points depending on their height above the reference plane. The height values may be relative height values, relative to the reference plane, or absolute height values (e.g., relative to sea level). The reference plane may correspond to the ground, floor, or an arbitrary plane selected by the user. The values may vary monochromatically as the height changes or may change colors as the height changes. In some embodiments, the overlay data can represent intensity values. The intensity values may correspond to a return strength of the laser beam as received by the LiDAR sensor. The intensity values may indicate material composition or characteristics of objects in the target environment. For example, based on the reflectivity of the material, characteristics of the material can be inferred (e.g., type of material, such as metal, wood, concrete, etc.) and the overlay information may indicate these characteristics through different color values assigned to the different characteristics. Additionally, or alternatively, in some embodiments, the point cloud data can be overlaid on a map of the target area being scanned. For example, the point cloud data can be overlaid on a two dimensional or three dimensional map provided by a mapping service.

As discussed, using a movable object (such as a UAV) to conduct a mapping mission may generate mapping data acquired by a scanning sensor that is coupled to the movable object. For example, point cloud data may be captured and generated using a LiDAR scanning sensor of a payload coupled to a UAV. The generated point cloud data is a three-dimensional representation of a target object or a target environment. As discussed, the raw 3D point cloud data, or the post-processed point cloud data that is processed by the post-processing application 308 and generated by the map generator 316, may have a standard 3D mapping data file format, such as a LiDAR Data Exchange File (LAS) or a Polygon (PLY) file, which may be used by various tools, such as visualization application 128, to render the map of the target object or the target environment and/or use the 3D mapping data for further processing, planning, playback, etc.

The present invention further discloses techniques of generating representation data of the 3D mapping data, such as generating a 2D image preview of a 3D point cloud data. In embodiments, the representation data may be in image file formats, such as JPEG, GIF, PNG, TIFF, BMP files, etc., while the original raw or post-processed mapping data may be in point cloud file formats, such as LAS or PLY files, etc. In other embodiments, the representation data may in other compressed file formats that is smaller than the standard point cloud file formats. For example, the representation data is generated by selecting a portion of the 3D mapping data or downsampling the 3D mapping data for compression. Take the generation of representation data by projection as an example, the 2D image preview is generated by projecting the 3D point cloud data onto a 2D plane based on a selective perspective of view of the 3D point cloud data. The projection of the 3D point cloud data onto a 2D plane may be conducted using perspective projection or orthographic projection. The perspective of view for projecting the 3D point cloud data may be selected as a top view or a side view of the target object or the target environment. The perspective of view may also be selected as a view that includes a largest number of feature points, so as to capture the most features of the target object or the target environment that best serves the purpose of providing a preview of the object or environment. In embodiments, the 2D plane may be a plane that is perpendicular to a center axis of the selected perspective of view, or any plane that intersect with the center axis of the selected perspective of view at certain angles. In embodiments, instead of projecting onto a 2D plane, the 3D mapping data may also be projecting unto a 2D curvature or other 2D surfaces comprising even or uneven planes, etc.

In another embodiment, ray-tracing technique may be used to generate the 2D image preview. In such embodiment, each pixel in the 2D image preview is generated based on tracing the path of virtual light and simulating the effects of the light's encounters with the target object or target environment. In another embodiment, the user may select other 2D image data as self-defined representation data, such as a photo image taken for the target object/environment, or image data obtained by an imaging sensor (e.g., RGB camera or grayscale camera) in the payload of the UAV during the past flight mission, or a sketch image drawn by the user. In such embodiment, similar to the representation data generated using the 3D point cloud data, user self-defined representation data may be used in a similar way and with similar techniques (e.g., associating the 2D representation data with the 3D mapping data, generating metadata of the 2D representation data, generating a combined mapping data that comprises 3D mapping data, 2D representation data, and metadata by data insertion, or storing the representation data in a separate file etc.) as described herein.

Figure 8:
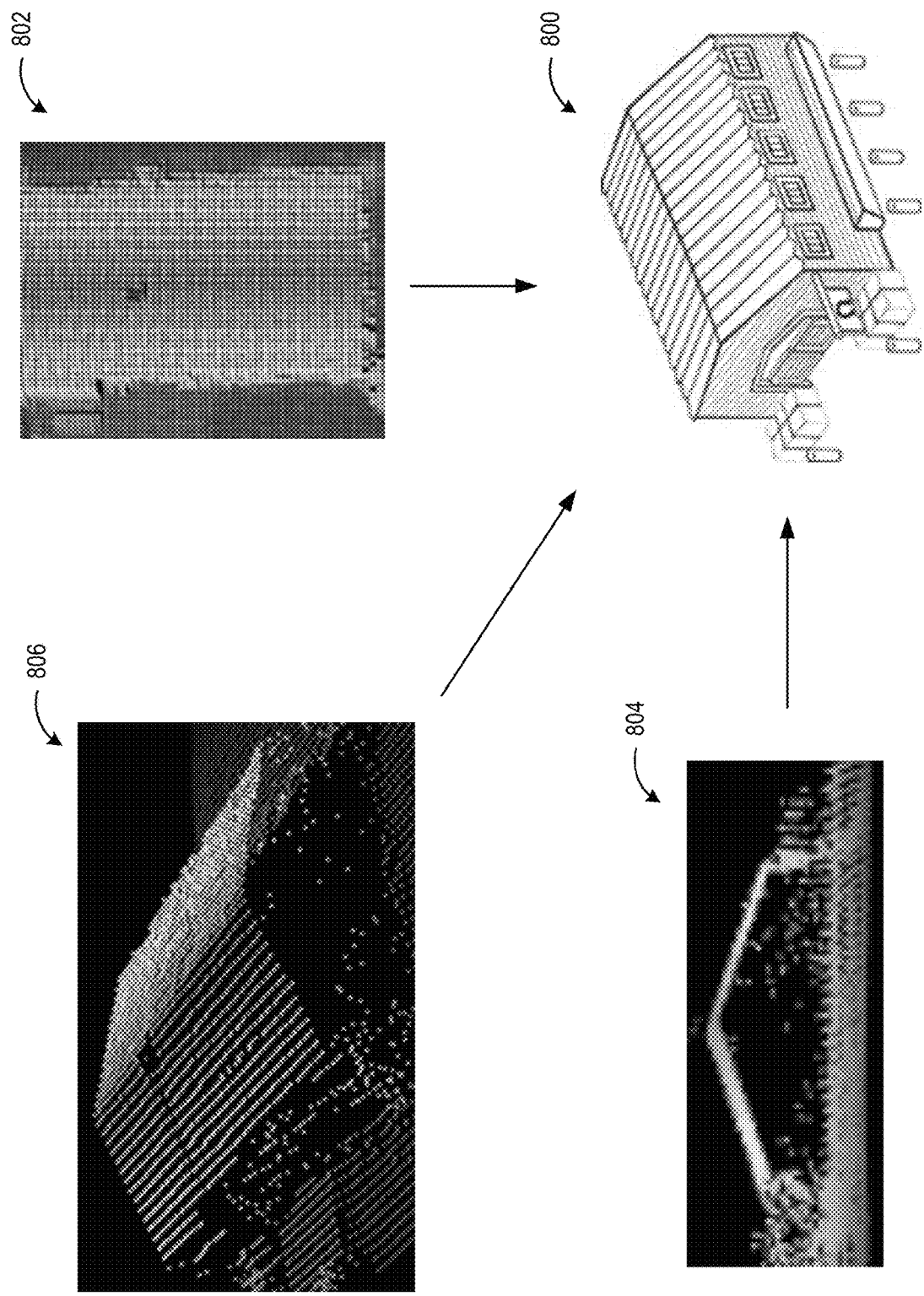
FIG. 8 illustrates examples of selected perspectives of view of mapping data, in accordance with various embodiments.

FIG. 8 illustrates examples of selected perspectives of view of mapping data, in accordance with various embodiments. As shown in FIG. 8, the 3D point cloud data of a target object 800 may be selected to be projected from the top of the point cloud data (e.g., top view 802 of the point cloud data). The top view is selected to project the 3D point cloud data on to a 2D plane that is horizontal relative to the reference plane, such as relative to the ground. The reference plane may correspond to the ground, floor, sea level, or an arbitrary plane selected by the user. The 3D point cloud data of a target object 800 may be selected to be projected from a side of the point cloud data (e.g., side view 804 of the point cloud data). The side view is selected to project the 3D point cloud data on to a 2D plane that is perpendicular relative to the reference plane, such as relative to the ground. The reference plane may correspond to the ground, floor, sea level, or an arbitrary plane selected by the user. The 3D point cloud data of a target object 800 may be selected to be projected from a view of the point cloud data that comprises a largest number of feature points (e.g., a view 806 of the point cloud data having the most feature points). The view with the largest number of feature points of the 3D point cloud data is selected to reflect the most features of the 3D point cloud data, such that the representation data to be generated will capture the most unique features of the target object 800.

FIGS. 9A and 9B illustrates examples of projecting three-dimensional mapping data onto a two-dimensional plane, in accordance with various embodiments. As discussed, the projection of the 3D point cloud data onto a 2D plane may be conducted by perspective projection or orthographic projection. FIG. 9A illustrates an example of perspective projection of the 3D point cloud data of the target object 900 onto a 2D projection plane 902 to generate representation data, such as a 2D image preview 904. The perspective projection or perspective transformation is a linear projection where lines of projection 906 are originated from a single point (e.g., a center of projection 908). The projected image 904 on the projection plane 902 is seen as of a viewer's eyes were located at the center of projection 908, and the lines of projection correspond to light path originating from the target object 900. Perspective projection has the effect that objects farther away appear to be smaller than nearer objects.

In embodiments, after a perspective of view (such as a top view 802, a side view 804, or a view 804 with the most feature points as illustrated in FIG. 8) of the 3D point cloud data is selected, each point of the 3D point cloud is first being transformed into the coordinate system associated with the selected perspective of view. All the points in the point cloud data are then scanned and projected onto each unit of the projection plane 902 based on perspective projection. According to the projection points located in each unit plane, the boundaries of the top, bottom, left, and rights of the points in each unit of the projection plane 902 are calculated. Afterwards, pixel blocks may be generated by discretizing each unit of the projection plane 902 according to certain resolution value. In the process, each pixel block may be updated to record information (such as intensity or color value) of the nearest point to the center of projection in order to form the final 2D image preview of the representation data. In embodiments, the generated representation data may be in image file formats, such as JPEG, GIF, PNG, TIFF, BMP files, etc., while the mapping data may be in point cloud file formats, such as LAS or PLY files, etc. In other embodiments, the representation data may in other compressed file formats that is smaller than the standard point cloud file formats. For example, the representation data is generated by selecting a portion of the 3D mapping data or downsampling the 3D mapping data for compression. The generated representation data may be stored in a different file, or inserted into the original point cloud data by data insertion as discussed in detail below.

FIG. 9B illustrates an example of orthographic projection of the 3D point cloud data of the target object 900 onto a 2D projection plane 902 to generate representation data, such as a 2D image preview 904. The orthographic projection or orthographic transformation is a parallel projection where lines of projection 906 are parallel. The projected image 904 on the projection plane 902 are formed by extending parallel projection lines 906 from each vertex on the target object 900 until they intersect the projection plane 902. Orthographic projection has the effect that each line of the objects that is originally parallel will remain parallel after the projection.

In embodiments, after a perspective of view (such as a top view 802, a side view 804, or a view 804 with the most feature points as illustrated in FIG. 8) of the 3D point cloud data is selected, each point of the 3D point cloud is first being transformed into the coordinate system associated with the selected perspective of view. All the points in the point cloud data are then scanned and projected onto each unit of the projection plane 902 based on orthographic projection. According to the projection points located in each unit plane, the boundaries of the top, bottom, left, and rights of the points in each unit of the projection plane 902 are calculated. Afterwards, pixel blocks may be generated by discretizing each unit of the projection plane 902 according to certain resolution value. In the process, each pixel block may be updated to record information (such as intensity or color value) of the farthest point to the pixel block in order to form the final 2D image preview of the representation data. In embodiments, the generated representation data may be in image file formats, such as JPEG, GIF, PNG, TIFF, BMP files, etc., while the mapping data may be in point cloud file formats, such as LAS or PLY files, etc. In other embodiments, the representation data may in other compressed file formats that is smaller than the standard point cloud file formats. For example, the representation data is generated by selecting a portion of the 3D mapping data or downsampling the 3D mapping data for compression. The generated representation data may be stored in a different file, or inserted into the original point cloud data by data insertion as discussed in detail below.

Figure 10A:
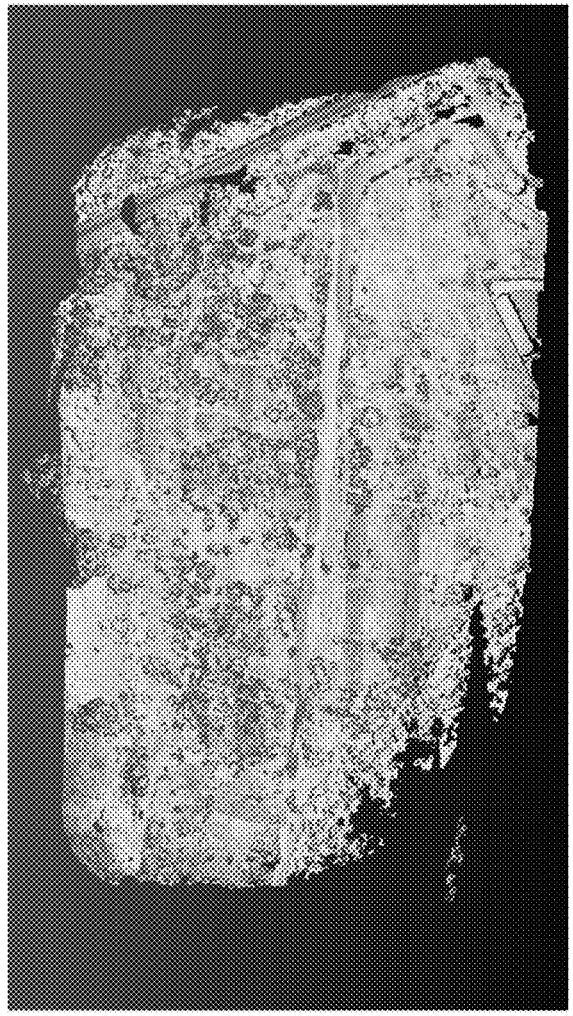
FIGS. 10A and 10B illustrate examples of selected perspectives of view of mapping data in a mapping mission, in accordance with various embodiments.
Figure 10B:
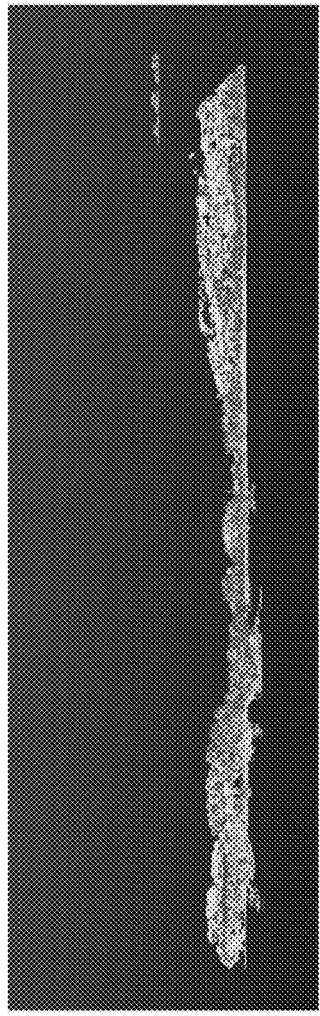

FIGS. 10A and 10B illustrate examples of selected perspectives of view of mapping data in a mapping mission, in accordance with various embodiments. FIG. 10A illustrates an example of a selected top view 1000 of point cloud data generated in a mapping mission for scanning the target environment. FIG. 10B illustrates an example of a selected side view 1002 of point cloud data generated in a mapping mission for scanning the target environment. In embodiments, the point cloud data illustrated in FIGS. 10A and 10B may be in standard point cloud file formats, such as LAS or PLY files, etc.

In embodiments, the point cloud data is colorized based on overlay information of the points that are being projected based on the selective perspective of view (i.e., the projected points). As discussed in FIG. 7, overlay information 702 can be obtained from the RGB camera or other sensors incorporated into the payload. For example, in some embodiments, the overlay data can include color data of the projected points which may include pixel values of various color schemes (e.g., 16-bit, 32-bit, etc.). The color data can be extracted from one or more images captured by the RGB camera at the same time as the point cloud data was captured by the scanning sensor and these color values can be overlaid on the visualization of the projected points in the point cloud data.

Although depicted in FIG. 7 as grayscale, the color data may include various color values depending on the color values of the image data captured by the RGB camera. In some embodiments, the overlay data can include height above a reference plane. For example, a color value may be assigned to the projected points depending on their height above the reference plane. The height values may be relative height values, relative to the reference plane, or absolute height values (e.g., relative to sea level). The reference plane may correspond to the ground, floor, or an arbitrary plane selected by the user. The values may vary monochromatically as the height changes or may change colors as the height changes. In some embodiments, the overlay data can represent intensity values of the points projected from the selective perspective of view. The intensity values may correspond to a return strength of the laser beam as received by the LiDAR sensor. The intensity values may indicate material composition or characteristics of objects in the target environment. For example, based on the reflectivity of the material, characteristics of the material can be inferred (e.g., type of material, such as metal, wood, concrete, etc.) and the overlay information may indicate these characteristics through different color values assigned to the different characteristics. Additionally, or alternatively, in some embodiments, the projected points in the point cloud data can be overlaid on a map of the target environment being scanned from the same perspective of view. For example, the points in the point cloud data that are projected from the top view can be overlaid on a two dimensional map provided by a mapping service from the same top view.

Figure 11:
FIG. 11 illustrates an example of the generated representation data of the mapping data in the mapping mission, in accordance with various embodiments.

FIG. 11 illustrates an example of the generated representation data of the mapping data in the mapping mission, in accordance with various embodiments. As illustrated in FIG. 11, an image preview 1100 is generated by projecting points a 2D image plane from a selected top view 1000 of the associated point cloud data shown is FIG. 10A. In embodiments, the image preview 1100 may be in standard image file formats, such as JPEG, GIF, PNG, TIFF, BMP files, etc., which has a much lesser file size (usually in megabytes) than the file size of point cloud data (usually in gigabytes) shown in FIG. 10A. In embodiments, each pixel of the generated representation data 1100 may also be colorized based on certain colorization mapping logic to reflect the color, intensity, or height values of the associated point cloud data. For examples, as shown in FIG. 7, overlay information 702 obtained from the RGB camera or other sensors incorporated into the payload may be used for the representation data colorization mapping. For example, in some embodiments, the overlay data can include color data of the projected points which may include pixel values of various color schemes (e.g., 16-bit, 32-bit, etc.). The color data can be extracted from one or more images captured by the RGB camera at the same time as the point cloud data was captured by the scanning sensor. These color values can be overlaid on the visualization of the projected points in the point cloud data, and may further be overlaid onto the pixels of projection image 1100 corresponding to the associated point cloud data.

Although depicted in FIG. 7 as grayscale, the color data may include various color values depending on the color values of the image data captured by the RGB camera. In some embodiments, the overlay data can include height above a reference plane. For example, a color value may be assigned to the projected points depending on their height above the reference plane, and further be assigned to each pixel of the projection image 1100 associated with the each projected point. The height values may be relative height values, relative to the reference plane, or absolute height values (e.g., relative to sea level). The reference plane may correspond to the ground, floor, or an arbitrary plane selected by the user. The values may vary monochromatically as the height changes or may change colors as the height changes. In some embodiments, the overlay data can represent intensity values of the points projected from the selective perspective of view. The intensity values may correspond to a return strength of the laser beam as received by the LiDAR sensor. The intensity values may indicate material composition or characteristics of objects in the target environment. For example, based on the reflectivity of the material, characteristics of the material can be inferred (e.g., type of material, such as metal, wood, concrete, etc.) and the overlay information may indicate these characteristics through different color values assigned to the different characteristics. Additionally, or alternatively, in some embodiments, the pixels of the generated representation data 1100 can be overlaid on a map of the target environment being scanned from the same perspective of view. For example, the pixels of the representation data 1100 associated with points in the point cloud data that are projected from the top view can be overlaid on a two dimensional map provided by a mapping service from the same top view.

In some embodiments, the generated representation data (that is generated based on perspective projection, orthographic projection, ray-tracing, or an image selected by the user) may further be processed to adjust the brightness of the image preview, such as the brightness of the whole image preview 1100 is automatically adjusted to fit into a most suitable range for visualization. For examples, a distribution of the brightness values of pixels in the image preview may be obtained. The mean value and the standard deviation may then be calculated based on the assumption of Gaussian distribution. Finally, according to a suitable range of standard deviation (usually ±5 standard deviations or a user-defined range), the brightness values within the range may be linearly mapped to the entire desired brightness range (such between 0-255).

As discussed, the generated representation data (e.g., a 2D image preview) may be in standard image file formats, such as JPEG, GIF, PNG, TIFF, BMP files, etc. The pixel format of each pixel in the 2D image preview may include information, such as pixel location (x and y coordinates), intensity value, RGB color values. In some embodiments, when the intensity value of a pixel is less than 0, it represents that this pixel uses RGB colorization. In one embodiment, the pixel format of the generated representation data is shown as follows.

```
struct preview_pixel
{
uint32 x;
uint32 y;
int8   intensity;
uchar red;
uchar green;
uchar blue;
};
```

Figure 12:
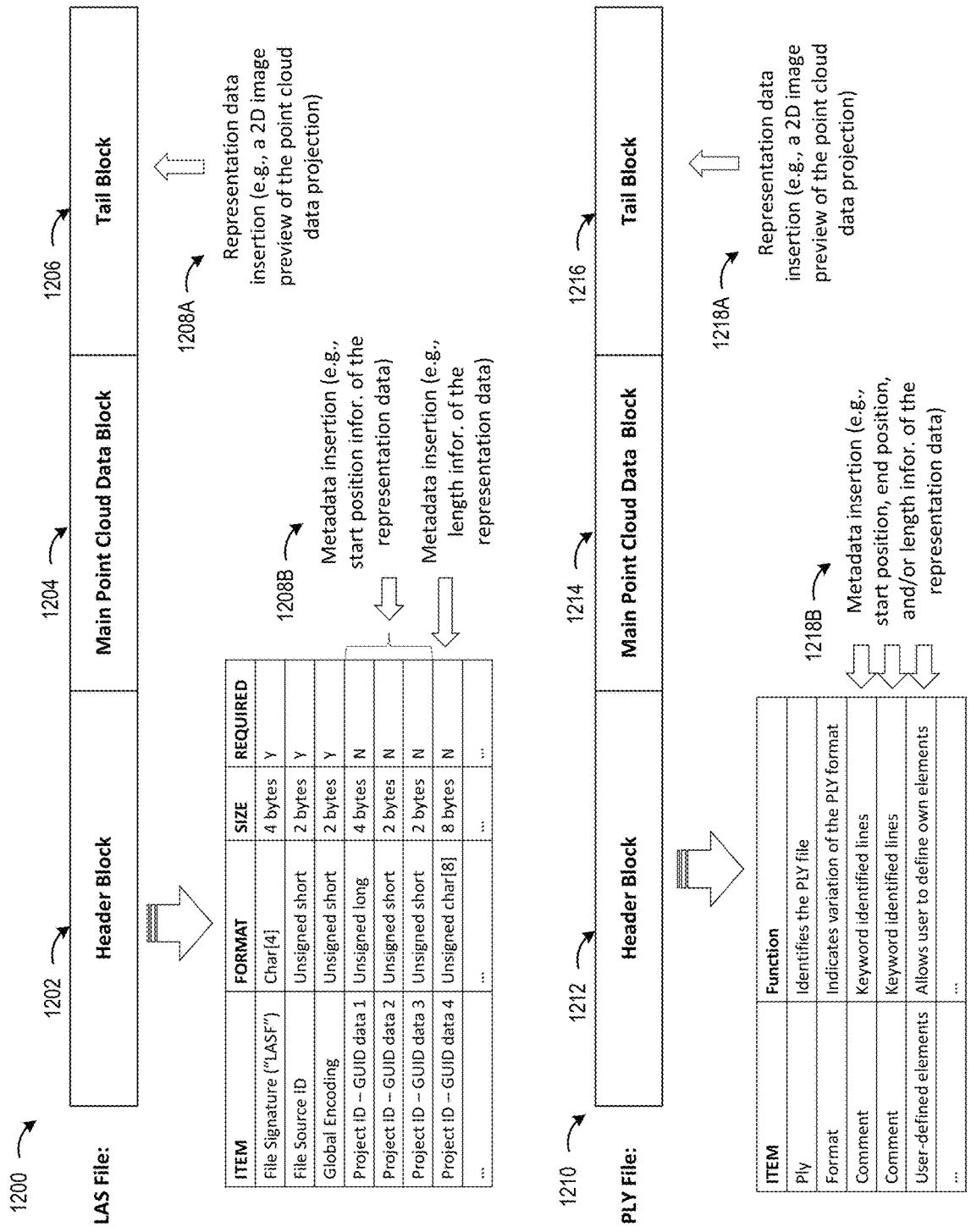
FIG. 12 illustrates an example of data insertion of representation data and metadata data into mapping data based on different file formats, in accordance with various embodiments.

FIG. 12 illustrates an example of data insertion of representation data and metadata data into mapping data based on different file formats, in accordance with various embodiments. FIG. 12 shows examples of point cloud data in LAS file format 1200 and in PLY file format 1210. It is to be understood that other standard three-dimensional mapping data file formats may be used to perform similar techniques disclosed herein. As shown in FIG. 12, a standard LAS file 1200 may have a data structure with different data blocks, including at least a header block 1202, a main point cloud data block 1204, and a tail block 1206. The header block 1202 usually contains generic data, such as file format, file creation time, a total number of points, coordinate bounds, etc. The main point cloud data block 1204 contain mapping data of all the collected points in the point cloud data. The tail block 1206 contains extended information, such as projection information, to be appended to the end of the LAS file without having to rewrite the entire file.

As discussed, representation data of the LAS file may be generated by projecting the 3D point cloud data stored in the LAS file onto a 2D image plane through perspective projection, orthographic projection, or ray-tracing techniques. In other embodiments, the representation data may be selected and assigned by the user from existing images or images drawn by the user. After the representation data is selected, it may be associated with the point cloud data that contains pre-projected point cloud data. The association may be conducted based on a file format (such as LAS file or PLY file) of the point cloud data. Take the LAS file 1200 for an example, one way to associate the representation data with the LAS file is to store the representation data as a separate image file in standard image file formats, such as JPEG, GIF, PNG, TIFF, BMP files, etc. In such embodiment, metadata of the separate image file is generated and stored to the LAS file 1200, such as at a header block 1202. The metadata of the separate image file may comprise a pointer that directs the visualization application to the memory address of the separate image file for retrieving and displaying the image file as a preview image to the user. In that way, the visualization application may only need to read the header block 1202 of the LAS file 1200 to retrieve the image preview having a much smaller file size (usually in kilobytes or megabytes), rather than to read through the whole LAS file 1200 having a huge file size (usually in gigabyte). This sufficiently reduces the processing time and data transmission bandwidth, and provides an intuitively preview image for a user to identify a specific LAS file among a plurality of LAS files. The metadata of the image preview file may also comprise other information, such as an end pointer indicating an end position of the inserted representation data or length data indicating a size of the inserted representation data.

Another way to associate the representation data with the LAS file is to append the representation data at the tail block 1206 of the original LAS file through data insertion 1208A, so as to create a combined LAS file that comprises the point cloud data and its associated representation data. In other embodiments, the representation data may be inserted at a middle position of the main point cloud data block 1204. Further, metadata associated with the generated representation data may further be generated. The metadata may information related to the inserted representation data, such as information regarding the start position, the end position, or the length/size of the inserted representation data. The generated metadata may be inserted into the LAS file at the header block 1202. For example, metadata indicating the start position of the inserted representation data may be written to the GUID data 1 to GUILD data 3 data blocks of the header block 1202 by data insertion 1208B. Similarly, metadata indicating a length of the inserted representation data may be written to the GUID data 4 data block of the header block 1202 by data insertion 1208B.

After inserting the representation data 1208A and the metadata of the representation data 1208B into the original LAS file, a combined LAS file is formed. The combined LAS file and the original LAS file have the same standard point cloud data format. By keeping the file format of the combined point cloud data and the original point cloud data in consistency, the combined point cloud data is recognizable by commercial point cloud visualization application/service/browser provided online or off-line by any third party provider without further modifications. The combined LAS file comprises representation data and its metadata, where the representation data serves as a preview image for the user to easily identify a specific point cloud file among a plurality of files. For example, when a user would like to use the visualization application to check recorded point cloud data files, a preview image of each recorded point cloud data files may be shown to the user, such that the user may intuitively identify an interested file. Instead of opening all the point cloud data files to check their contents, the user just needs to open the interested file to perform further applications, such as to post-process the interested point cloud file, to perform playback function of the interested point cloud recording, or to further edit the interested point cloud file, etc. As such, the user may save time for selecting among the plurality of point cloud data files. Since the image preview may also be provided prior to downloading the point cloud data to the visualization application, the data communication bandwidth for downloading the point cloud data files from the movable object or the computing device may also be saved.

As shown in FIG. 12, a standard PLY file 1210 may have a data structure with different data blocks, including at least a header block 1212, a main point cloud data block 1214, and a tail block 1216. The header block 1212 usually contains generic data, such as file format, variation versions of the file format, etc. The main point cloud data block 1214 contain mapping data of all the collected points in the point cloud data. The tail block 1216 contains extended information, such as projection information, to be appended to the end of the PLY file without having to rewrite the entire file.

As discussed, representation data of the PLY file may be generated by projecting the 3D point cloud data stored in the PLY file onto a 2D image plane through perspective projection, orthographic projection, or ray-tracing techniques. In other embodiments, the representation data may be selected and assigned by the user from existing images or images drawn by the user. After the representation data is selected, it may be associated with the point cloud data that contains pre-projected point cloud data. The association may be conducted based on a file format (such as LAS file or PLY file) of the point cloud data. Take the PLY file 1210 for an example, one way to associate the representation data with the PLY file is to store the representation data as a separate image file in standard image file formats, such as JPEG, GIF, PNG, TIFF, BMP files, etc. In such embodiment, metadata of the separate image file is generated and stored to the ply file 1210, such as at a header block 1212. The metadata of the separate image file may comprise a pointer that directs the visualization application to the memory address of the separate image file for retrieving and displaying the image file as a preview image to the user. In that way, the visualization application may only need to read the header block 1212 of the PLY file 1200 to retrieve the image preview having a much smaller file size (usually in kilobytes or megabytes), rather than to read through the whole PLY file 1210 having a huge file size (usually in gigabyte). This sufficiently reduces the processing time and data transmission bandwidth, and provides an intuitively preview image for a user to identify a specific PLY file among a plurality of PLY files. The metadata of the image preview file may also comprise other information, such as an end pointer indicating an end position of the inserted representation data or length data indicating a size of the inserted representation data.

Another way to associate the representation data with the PLY file is to append the representation data at the tail block 1216 of the original PLY file through data insertion 1218A, so as to create a combined PLY file that comprises the point cloud data and its associated representation data. In other embodiments, the representation data may be inserted at a middle position of the main point cloud data block 1214. Further, metadata associated with the generated representation data may further be generated. The metadata may information related to the inserted representation data, such as information regarding the start position, the end position, or the length/size of the inserted representation data. The generated metadata may be inserted into the PLY file at the header block 1212. For example, metadata indicating the start position, the end position, or the length/size of the inserted representation data may be written to the comment lines of the header block 1212 by data insertion 1218B.

Additionally, or optionally, the metadata or the inserted representation data may also be saved as user-defined elements of the PLY file and be written in the header block 1212. An example of the user-defined element that includes four pixels for metadata insertion may be defined by a user as follows.

```
element dji_pc_thumbnail_pixel 4
property uint32 x
property uint32 y
property int8   intensity
property uchar      red
property uchar  green
property uchar  blue
0,0,-1,100,100,100
0,1,-1,100,100,100
1,0,-1,100,100,100
1,1,-1,100,100,100
```

After inserting the representation data 1218A and the metadata of the representation data 1218B into the original PLY file, a combined PLY file is formed. The combined PLY file and the original PLY file have the same standard point cloud data format. By keeping the file format of the combined point cloud data and the original point cloud data in consistency, the combined point cloud data is recognizable by commercial point cloud visualization application/service/browser provided online or off-line by any third party provider without further modifications. The combined PLY file comprises representation data and its metadata, where the representation data serves as a preview image for the user to easily identify a specific point cloud file among a plurality of files. For example, when a user would like to use the visualization application to check recorded point cloud data files, a preview image of each recorded point cloud data files may be shown to the user, such that the user may intuitively identify an interested file. Instead of opening all the point cloud data files to check their contents, the user just needs to open the interested file to perform further applications, such as to post-process the interested point cloud file, to perform playback function of the interested point cloud recording, or to further edit the interested point cloud file, etc. As such, the user may save time for selecting among the plurality of point cloud data files. Since the image preview may also be provided prior to downloading the point cloud data to the visualization application, the data communication bandwidth for downloading the point cloud data files from the movable object or the computing device may also be saved.

Figure 13:
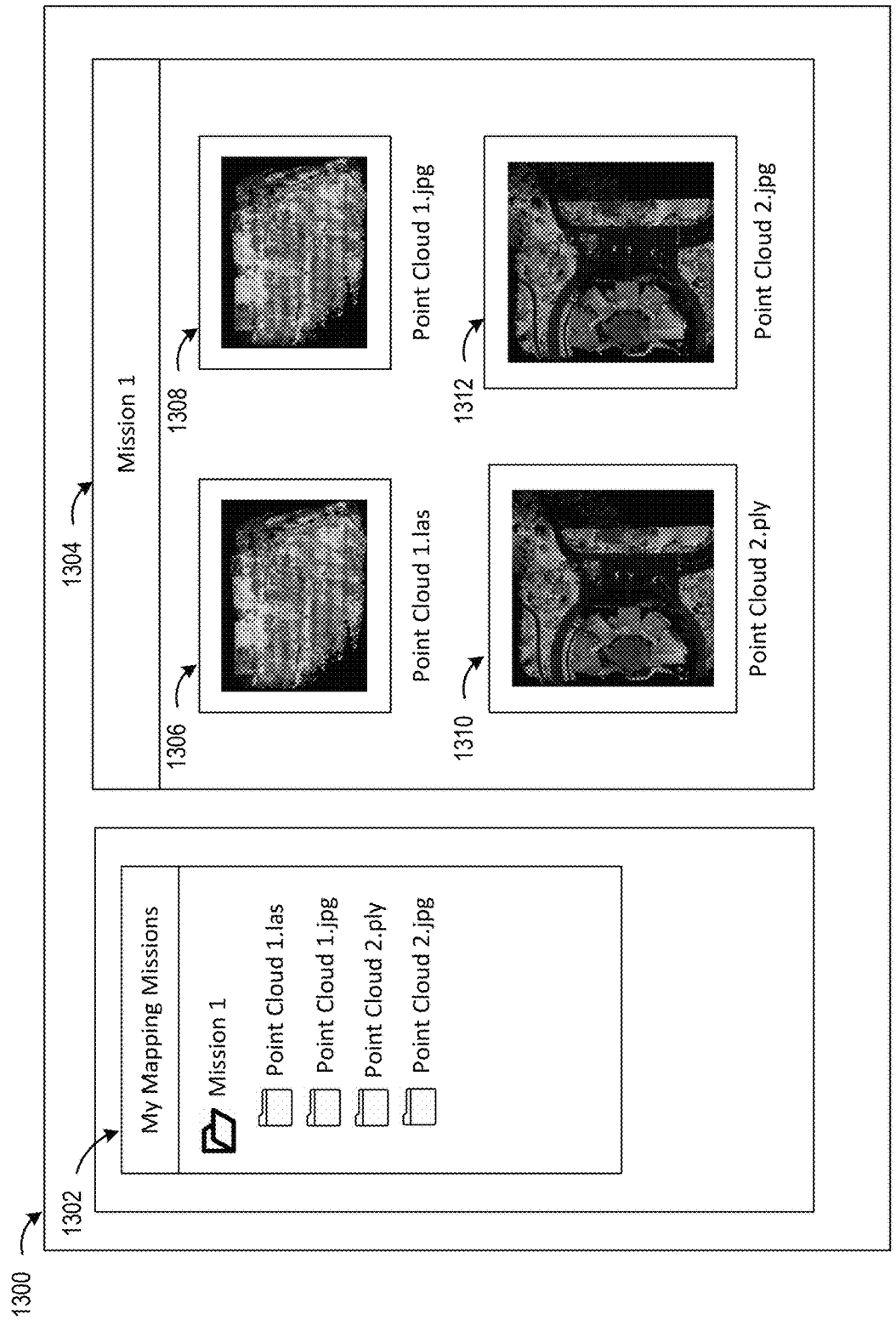
FIG. 13 illustrates an example of combined mapping data and representation data rendered on a display of a client device, in accordance with various embodiments.

FIG. 13 illustrates an example of combined mapping data and representation data rendered on a display of a client device, in accordance with various embodiments. The display 1300 of a client device may be used to display point cloud data folders or files through executing the visualization application on the client device. As shown in FIG. 13, a left pane 1302 of the display 1300 may show a user's recorded mapping missions. For example, the mapping mission may comprise a mission folder (such as the folder named "Mission 1" in FIG. 13) that saves the combined point cloud data files (such as the files named "Point Cloud 1.las" and "Point Cloud 2. ply" under the "Mission 1" folder) that includes the recorded point cloud, its associated representation data and metadata. As discussed, the combined mapping data may be in any standard point cloud file formats, such as the LAS file or the PLY file, that is recognizable by commercial point cloud visualization application/service/browser provided online or off-line by any third party provider without further modifications. In other embodiments, the representation data generated according to the present disclosure may optionally be saved as a separate image file with a file name associated with the combined point cloud data files (such as files named "Point Cloud 1.jpg" and "Point Cloud 2.jpg" under the "Mission 1" folder). In embodiments, the representation data or separate image file may be in other standard image file formats, such as JPEG, GIF, PNG, TIFF, BMP files, etc. In some embodiments, the file name of the separate image preview file may be the same as its associated combined point cloud data file. In other embodiments, other name rules may be applied for saving the separate image preview file.

Once the user opens the "Mission 1" folder, such as by clicking on the folder icon, the right pane 1304 of the display 1300 may show all the files stored under the "Mission 1" folder. As shown in FIG. 13, representation data is inserted into the original LAS file, such that a preview image 1306 of the combined point cloud LAS file may be viewable by the user. The representation data is optionally being saved as a separate image file 1308 that is also viewable by the user. As shown in FIG. 13, representation data is inserted into the original PLY file, such that a preview image 1310 of the combined point cloud PLY file may be viewable by the user. The representation data is optionally being saved as a separate image file 1312 that is also viewable by the user. In that way, the user may intuitively select interested point cloud data for further process, such as to replay the point cloud data recording using a playback application, to edit or post-process the point cloud data using third-party application, etc.

Figure 14:
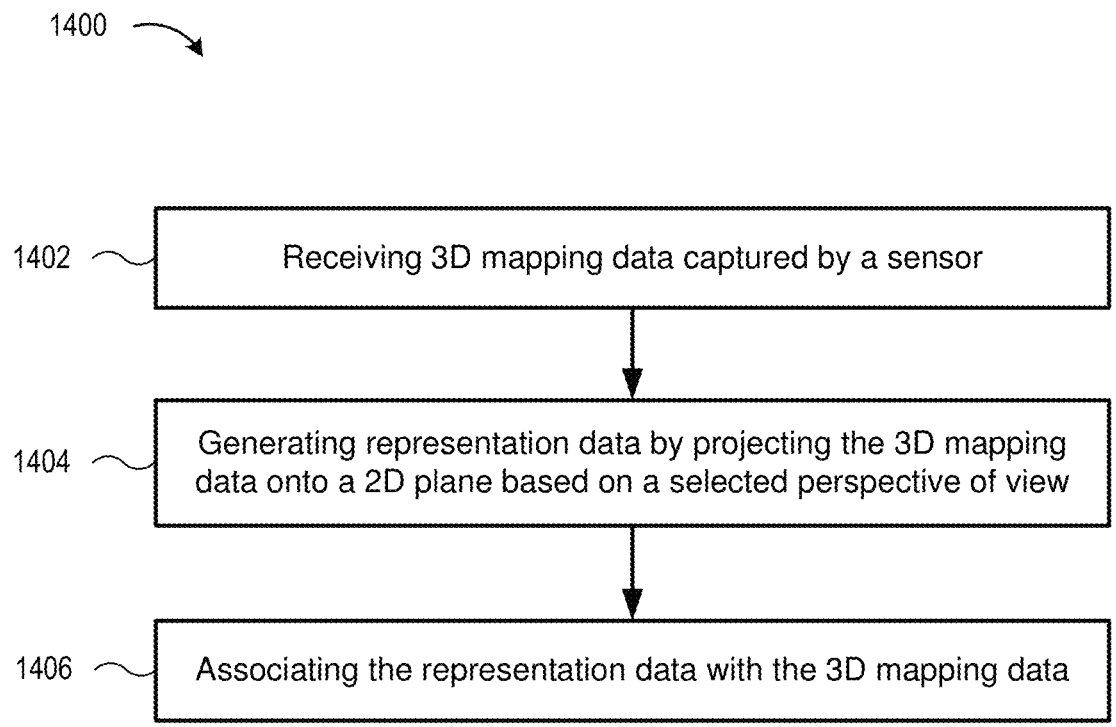
FIG. 14 shows a flowchart of a method of generating representation data using mapping data captured by a sensor in a movable object environment, in accordance with various embodiments.

FIG. 14 shows a flowchart of a method of generating representation data using mapping data captured by a sensor in a movable object environment, in accordance with various embodiments. At operation/step 1402, the method can include receiving 3D data captured by a sensor. In some embodiments, the sensor is a scanning sensor including a light detection and ranging (LiDAR) sensor that is coupled to a movable object. In some embodiments, the 3D mapping data includes point cloud data (such as LAS file or PLY file) collected by the LiDAR sensor including a plurality of points and corresponding color data. In some embodiments, the movable object is an unmanned aerial vehicle (UAV). In some embodiments, the sensor is coupled to the UAV.

At operation/step 1404, the method can include generating representation data by projecting the 3D mapping data onto a 2D plane based on a selected perspective of view. In some embodiments, the representation data is image data (such as JPEG, GIF, PNG, TIFF, BMP files). The representation data provides a preview of the 3D mapping data, where a file size of the representation data is smaller than the 3D mapping data for fast rendering. In some embodiments, the selected perspective of view is a top view, a side, or a view having a largest number of the feature points, as discussed in FIG. 8 above. In some embodiments, the representation data is projected onto a 2D plane that is perpendicular to a center axis of the selected perspective of view. In some embodiments, the 3D mapping data is projected onto the 2D plane by perspective projection or orthographic projection, as discussed in FIGS. 9A and 9B above. In other embodiment, the representation data can be obtained in other ways, such as by ray-tracing the 3D mapping data, selected by a user from existing images, or assigned by a user through user's drawing, etc. In some embodiments, projecting the 3D mapping data onto the 2D plane may be performed by: (1) transforming the point cloud data to a coordinate system that is associated with the selected perspective of view, and (2) generating the representation data by scanning and projecting each point of the point cloud data onto the 2D plane in the coordinate system.

At operation/step 1406, the method can include associating the representation data with the 3D mapping data. In some embodiments, the 3D mapping data is associated with a file format, such as a PLY file or a LAS file, and the representation data is associated with the 2D mapping data based on this file format. In some embodiments, the association includes generating a combined mapping data based on the generated representation data, the original 3D mapping data and its file format, as further discussed in FIG. 15.

Figure 15:
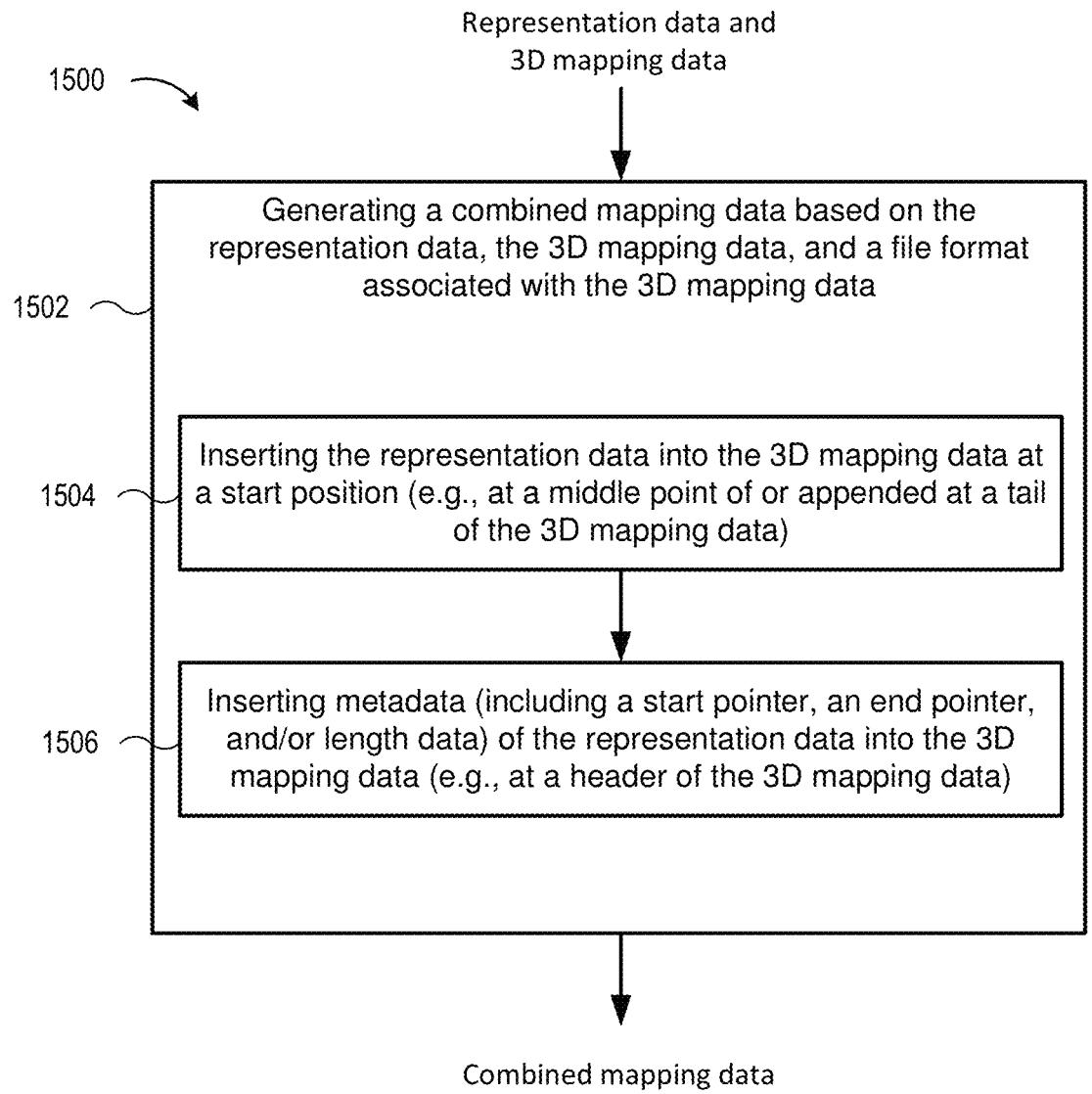
FIG. 15 shows a flowchart of a method of associating representation data with mapping data to generate a combined mapping data, in accordance with various embodiments.

FIG. 15 shows a flowchart of a method of associating representation data with mapping data to generate a combined mapping data, in accordance with various embodiments. As shown in FIG. 15, the combined mapping data is generated as an output based on the input 3D mapping data, the generated representation data based on the 3D mapping data, and the file format of the 3D mapping data. In some embodiments, the association is conducted by inserting the generated representation into the 3D mapping data to generate the combined mapping data, where the insertion position of the representation data is determined based on the file format. In some embodiments, metadata of the representation data may further be generated and inserted into the 3D mapping data, such that the original 3D mapping, the representation data, and the metadata are all included in the output combined mapping data. The metadata of the reorientation data contains information related to the inserted representation data, such as the start position, the end position, and/or a length/size of the inserted data.

At operation/step 1502, the method can include generating a combined mapping data based on the representation data, the 3D mapping data, and a file format associated with the 3D mapping data. In some embodiments, the output combined mapping data has the same file format as the input original 3D mapping data, such that it is recognizable by commercial point cloud visualization application/service/browser provided online or off-line by any third party provider without further modifications. As shown at operation/step 1504 and operation/step 1506, the operation/step of associating representation data with mapping data to generate a combined mapping data may comprise two sub-operation/sub-step of adding the representation data and its metadata into the 3D mapping data by data insertion techniques.

At operation/step 1504, the method can include inserting the representation data into the 3D mapping data at a start position (e.g., at a middle point of or appended at a tail of the 3D mapping data). In some embodiments, the representation data is inserted at a middle point of or appended at a tail of the 3D mapping data, such as inserting at the tail block of the PLY file or LAS file.)

At operation/step 1506, the method can include inserting metadata (including a start pointer, an end points, and/or length data) of the representation data into the 3D mapping data (e.g., at a header of the 3D mapping data). In some embodiments, the metadata of the representation data comprises a start pointer indicating the start position of the inserted representation data, an end pointer indicating an end position of the inserted representation data, or length data indicating a length of the inserted representation data. In some embodiments, the metadata is inserted at a header of the three-dimensional mapping data, such as inserting into one or more GUID blocks in the header block of the LAS file or one or more comments lines in the header block of the PLY file. In some embodiments, the metadata is may comprise self-defined information (such as generation time of the representation, etc.) and being inserted into the 3D mapping data, such as using user self-defined elements of the PLY file to insert the metadata of the representation data.

In some embodiments, prior to representation data and metadata insertion, the method can further include down-sampling the 3D mapping data by removing outlier data, and generating the representation data based on the down-sampled three-dimensional mapping data.

In some embodiments, the generated representation data may be colorized based on color overlay information, such as color, intensity, or height values corresponding to the 3D mapping point cloud data. In some embodiments, the colorization is conducted based on predefined color mapping logic.

In some embodiments, the brightness of the generated representation data may be adjusted based on intensity values corresponding to the three-dimensional mapping data.

In some embodiments, the user may define user-defined data associated with the representation data, and the method may further includes updating the representation data and the metadata based on the user-defined data. For example, the user may set up a specific size of the representation to show a suitable image preview (e.g., in a small/middle/large image). The representation data may be updated based on the user-defined size, and the metadata may also be updated to reflect the change.

Figure 16:
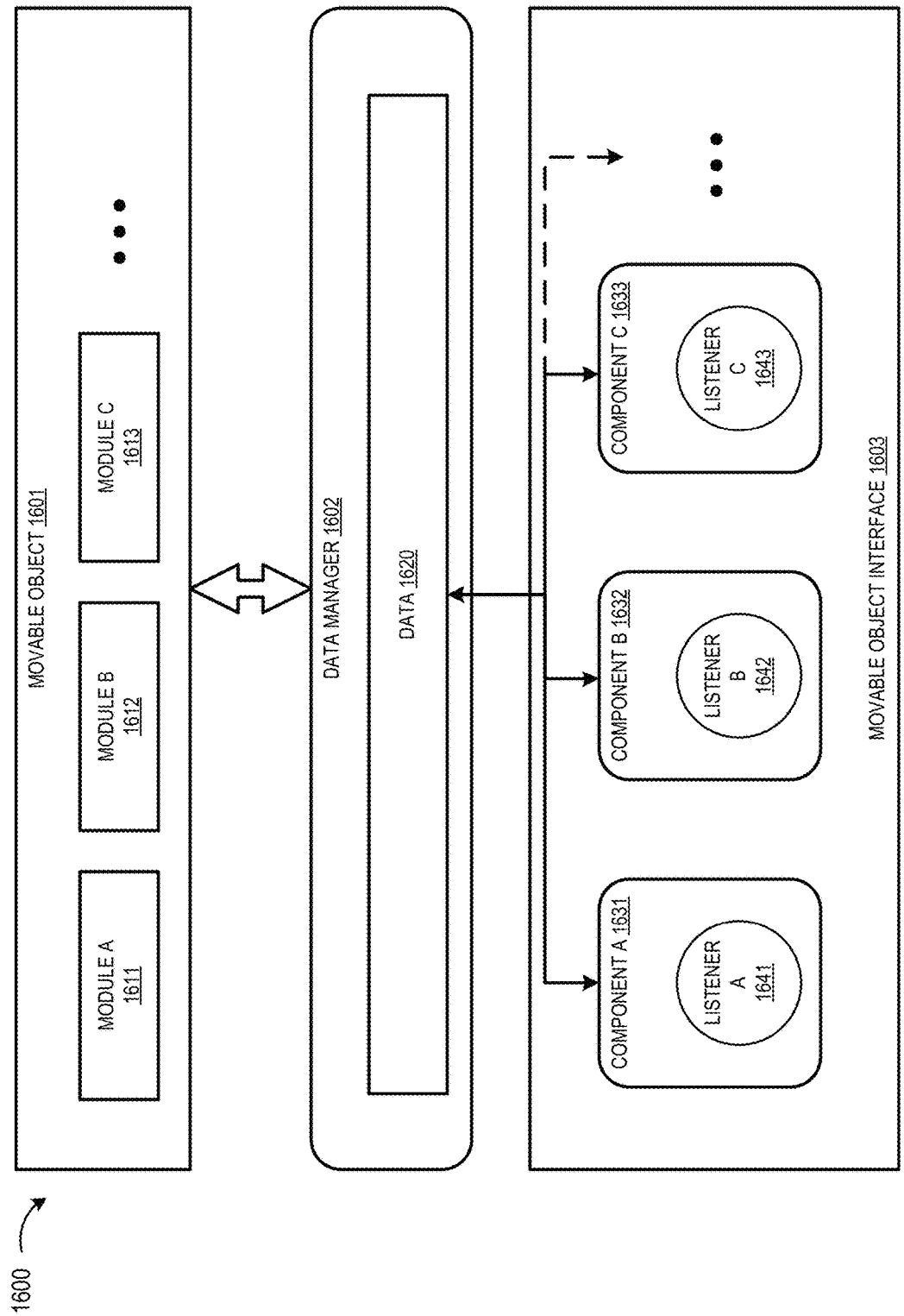
FIG. 16 illustrates an example of supporting a movable object interface in a software development environment, in accordance with various embodiments.

FIG. 16 illustrates an example of supporting a movable object interface in a software development environment, in accordance with various embodiments. As shown in FIG. 16, a movable object interface 1603 can be used for providing access to a movable object 1601 in a software development environment 1600, such as a software development kit (SDK) environment. As used herein, the SDK can be an onboard SDK implemented on an onboard environment that is coupled to the movable object 1601. The SDK can also be a mobile SDK implemented on an off-board environment that is coupled to a mobile device or a mobile device. Furthermore, the movable object 1601 can include various functional modules A-C 1611-1613, and the movable object interface 1603 can include different interfacing components A-C 1631-1633. Each said interfacing component A-C 1631-1633 in the movable object interface 1603 corresponds to a module A-C 1611-1613 in the movable object 1601. In some embodiments, the interfacing components may be rendered on a user interface of a display of a mobile device or other computing device in communication with the movable object. In such an example, the interfacing components, as rendered, may include selectable command buttons for receiving user input/instructions to control corresponding functional modules of the movable object.

In accordance with various embodiments, the movable object interface 1603 can provide one or more callback functions for supporting a distributed computing model between the application and movable object 1601.

The callback functions can be used by an application for confirming whether the movable object 1601 has received the commands. Also, the callback functions can be used by an application for receiving the execution results. Thus, the application and the movable object 1001 can interact even though they are separated in space and in logic.

As shown in FIG. 10, the interfacing components A-C 1631-1633 can be associated with the listeners A-C 1641-1643. A listener A-C 1641-1643 can inform an interfacing component A-C 1631-1633 to use a corresponding callback function to receive information from the related module(s).

Additionally, a data manager 1602, which prepares data 1620 for the movable object interface 1603, can decouple and package the related functionalities of the movable object 1601. The data manager 1602 may be onboard, that is coupled to or located on the movable object 1601, which prepares the data 1620 to be communicated to the movable object interface 1603 via communication between the movable object 1601 and a mobile device or a mobile device. The data manager 1602 may be off board, that is coupled to or located on a mobile device, which prepares data 1620 for the movable object interface 1603 via communication within the mobile device. Also, the data manager 1602 can be used for managing the data exchange between the applications and the movable object 1601. Thus, the application developer does not need to be involved in the complex data exchanging process.

For example, the onboard or mobile SDK can provide a series of callback functions for communicating instant messages and for receiving the execution results from a movable object. The onboard or mobile SDK can configure the life cycle for the callback functions in order to make sure that the information interchange is stable and completed. For example, the onboard or mobile SDK can establish connection between a movable object and an application on a smart phone (e.g. using an Android system or an iOS system). Following the life cycle of a smart phone system, the callback functions, such as the ones receiving information from the movable object, can take advantage of the patterns in the smart phone system and update the statements accordingly to the different stages in the life cycle of the smart phone system.

Figure 17:
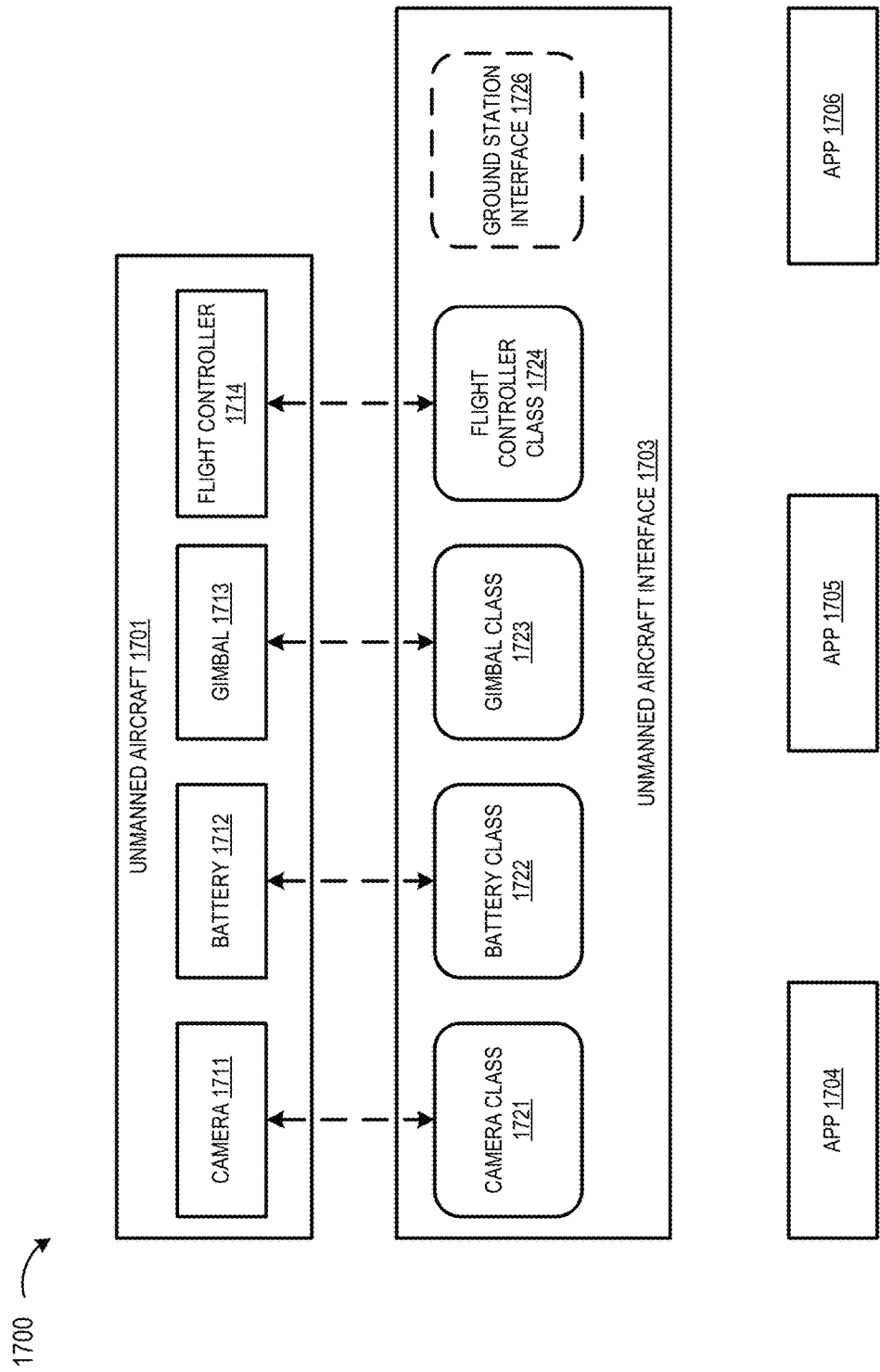
FIG. 17 illustrates an example of a movable object interface, in accordance with various embodiments.

FIG. 17 illustrates an example of a movable object interface, in accordance with various embodiments. As shown in FIG. 17, a movable object interface 1703 can be rendered on a display of a mobile device or other computing devices representing statuses of different components of a movable object 1701. Thus, the applications, e.g., APPs 1704-1706, in the movable object environment 1700 can access and control the movable object 1701 via the movable object interface 1703. As discussed, these apps may include an inspection app 1704, a viewing app 1705, and a calibration app 1706.

For example, the movable object 1701 can include various modules, such as a camera 1711, a battery 1712, a gimbal 1713, and a flight controller 1714.

Correspondently, the movable object interface 1703 can include a camera component 1721, a battery component 1722, a gimbal component 1723, and a flight controller component 1724 to be rendered on a computing device or other computing devices to receive user input/instructions by way of using the APPs 1704-1706.

Additionally, the movable object interface 1703 can include a ground station component 1726, which is associated with the flight controller component 1724. The ground station component operates to perform one or more flight control operations, which may require a high-level privilege.

Figure 18:
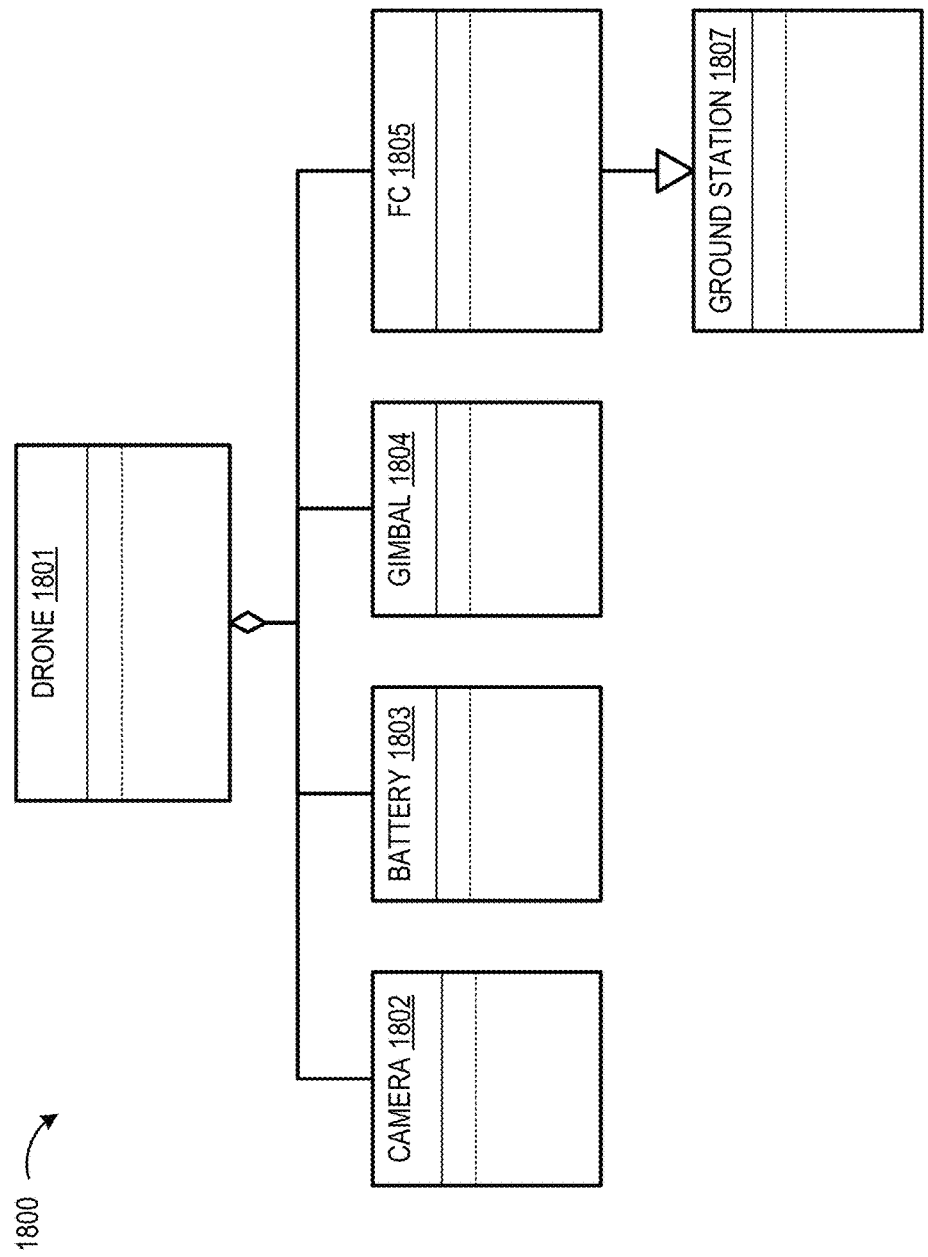
FIG. 18 illustrates an example of components for a movable object in a software development kit (SDK), in accordance with various embodiments.

FIG. 18 illustrates an example of components for a movable object in a software development kit (SDK), in accordance with various embodiments. As shown in FIG. 18, the drone class 1801 in the SDK 1800 is an aggregation of other components 1802-1807 for a movable object (e.g., a drone). The drone class 1801, which have access to the other components 1802-1807, can exchange information with the other components 1802-1807 and controls the other components 1802-1807.

In accordance with various embodiments, an application may be accessible to only one instance of the drone class 1801. Alternatively, multiple instances of the drone class 1801 can present in an application.

In the SDK, an application can connect to the instance of the drone class 1801 in order to upload the controlling commands to the movable object. For example, the SDK may include a function for establishing the connection to the movable object. Also, the SDK can disconnect the connection to the movable object using an end connection function. After connecting to the movable object, the developer can have access to the other classes (e.g. the camera class 1802, the battery class 1803, the gimbal class 1804, and the flight controller class 1805). Then, the drone class 1801 can be used for invoking the specific functions, e.g. providing access data which can be used by the flight controller to control the behavior, and/or limit the movement, of the movable object.

In accordance with various embodiments, an application can use a battery class 1803 for controlling the power source of a movable object. Also, the application can use the battery class 1803 for planning and testing the schedule for various flight tasks. As battery is one of the most restricted elements in a movable object, the application may seriously consider the status of battery not only for the safety of the movable object but also for making sure that the movable object can finish the designated tasks. For example, the battery class 1803 can be configured such that if the battery level is low, the movable object can terminate the tasks and go home outright. For example, if the movable object is determined to have a battery level that is below a threshold level, the battery class may cause the movable object to enter a power savings mode. In power savings mode, the battery class may shut off, or reduce, power available to various components that are not integral to safely returning the movable object to its home. For example, cameras that are not used for navigation and other accessories may lose power, to increase the amount of power available to the flight controller, motors, navigation system, and any other systems needed to return the movable object home, make a safe landing, etc.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1802 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1802 for modifying the setting of photos and records. For example, the SDK may include a function that enables the developer to adjust the size of photos taken. Also, an application can use a media class for maintaining the photos and records.

In accordance with various embodiments, an application can use a gimbal class 1804 for controlling the view of the movable object. For example, the Gimbal Class can be used for configuring an actual view, e.g. setting a first personal view of the movable object. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1805 for providing various flight control information and status about the movable object. As discussed, the flight controller class can include functions for receiving and/or requesting access data to be used to control the movement of the movable object across various regions in a movable object environment.

Using the Flight Controller Class, an application can monitor the flight status, e.g. using instant messages. For example, the callback function in the Flight Controller Class can send back the instant message every one thousand milliseconds (1000 ms).

Furthermore, the Flight Controller Class allows a user of the application to investigate the instant message received from the movable object. For example, the pilots can analyze the data for each flight in order to further improve their flying skills.

In accordance with various embodiments, an application can use a ground station class 1807 to perform a series of operations for controlling the movable object.

For example, the SDK may require applications to have an SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the movable object.

Many features can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanism utilizing the results. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A method for generating representation data of three-dimensional mapping data, comprising:
   receiving three-dimensional mapping data captured by a sensor;
   generating, via a processor, representation data by projecting the three-dimensional mapping data onto a two-dimensional plane based on a selected perspective of view;
   associating, via the processor, the representation data with the three-dimensional mapping data, wherein the associating the representation data with the three-dimensional mapping data comprises: generating a combined mapping data based on the representation data and the three-dimensional mapping data; and
   displaying the combined mapping data, wherein the representation data provides a small-sized preview image of the large-sized three-dimensional mapping data, the preview image is configured to form a file cover of the combined mapping data, and the preview image contains information of the combined mapping data for a user to identify a mapping mission through image visualization.

2. The method of claim 1, wherein the three-dimensional mapping data is point cloud data, and the representation data is image data.

3. The method of claim 1, wherein the representation data is configured to provide a preview of the three-dimensional mapping data, and wherein a size of the representation data is smaller than the three-dimensional mapping data such that the representation is rendered faster than the three-dimensional mapping data.

4. The method of claim 1, wherein the selected perspective of view is a top view, a side view, or a view of the three-dimensional mapping data having a largest number of feature points.

5. The method of claim 1, wherein the three-dimensional mapping data is point cloud data, and projecting the point cloud data onto the two-dimensional plane based on the selected perspective of view comprises:
   transforming the point cloud data to a coordinate system associated with the selected perspective of view; and
   generating the representation data by scanning and projecting each point of the point cloud data onto the two-dimensional plane in the coordinate system.

6. The method of claim 1, wherein the three-dimensional mapping data is projected onto the two-dimensional plane by orthographic projection or perspective projection, or wherein the representation data is obtained by ray tracing the three-dimensional mapping data.

7. The method of claim 1, wherein the three-dimensional mapping data being associated with a file format, and wherein associating the representation data with the three-dimensional mapping data further comprises:
   generating the combined mapping data based on the representation data, the three-dimensional mapping data, and the file format, wherein the combined mapping data and the three-dimensional mapping data having a same file format.

8. The method of claim 7, wherein generating the combined mapping data further comprises:
   inserting, via the processor, the representation data into the three-dimensional mapping data; and
   inserting, via the processor, metadata of the representation data into the three-dimensional mapping data.

9. The method of claim 8, wherein the representation data is inserted at a start position of the three-dimensional mapping data, and wherein the metadata of the representation data comprises at least one of: a start pointer indicating the start position of the inserted representation data, an end pointer indicating an end position of the inserted representation data, and length data indicating a length of the inserted representation data.

10. The method of claim 8, wherein the representation data is inserted at a middle point of or appended at a tail of the three-dimensional mapping data, and wherein the metadata is inserted at a header of the three-dimensional mapping data.

11. The method of claim 8, wherein the file format of the three-dimensional mapping data is a LAS file and the metadata is inserted into a GUID block in a header of the LAS file, or wherein the file format of the three-dimensional mapping data is a PLY file and the metadata is inserted into a comment in a header of the PLY file.

12. The method of claim 1, further comprising:
   coloring, via the processor, the representation data based on color, intensity, or height values corresponding to the three-dimensional point cloud data, wherein the coloring is based on predefined color mapping logic.

13. The method of claim 1, further comprising:
adjusting, via the processor, brightness of the representation data based on intensity values corresponding to the three-dimensional mapping data.

14. The method of claim 8, further comprising:
receiving, by the processor, user-defined data associated with the representation data; and
updating, via the processor, the representation data and the metadata based on the user-defined data.

15. A system for generating representation data of three-dimensional mapping data, comprising:
a sensor coupled to a movable object, the sensor configured to capture the three-dimensional mapping data in an environment; and
a processor in communication with the sensor or the movable object, wherein the processor is configured to:
receive three-dimensional mapping data captured by the sensor;
generate representation data by projecting the three-dimensional mapping data onto a two-dimensional plane based on a selected perspective of view; wherein the generating representation data comprises:
transforming each point of the three-dimensional mapping data into the coordinate system associated with the selected perspective of view;
scanning and projecting all the points of the three-dimensional mapping data onto each unit of the two-dimensional plane; calculating the boundaries of the top, bottom, left, and rights of the points in each unit of the two-dimensional plane, according to the projection points located in each unit plane; and
generating pixel blocks by discretizing each unit of the two-dimensional plane according to certain resolution value; updating each pixel block to record information of the farthest point to the pixel block in order to form a preview image of the representation data;
associate the representation data with the three-dimensional mapping data, wherein the associating the representation data with the three-dimensional mapping data comprises: generating a combined mapping data based on the representation data and the three-dimensional mapping data, and
display the combined mapping data, wherein the representation data provides the preview image of the three-dimensional mapping data.

16. The system of claim 15, wherein the three-dimensional mapping data being associated with a file format, and wherein when associating the representation data with the three-dimensional mapping data, the processor is further configured to:
generate the combined mapping data based on the representation data, the three-dimensional mapping data, and the file format.

17. The system of claim 16, wherein when generating the combined mapping data, the processor is further configured to:
insert, via the processor, the representation data into the three-dimensional mapping data.

18. An apparatus for generating representation data of three-dimensional mapping data, comprising:
a processor; and
a storage medium storing instructions that, when executed by the processor, cause the processor to:
receive three-dimensional mapping data captured by a sensor;
generate representation data by projecting the three-dimensional mapping data onto a two-dimensional plane based on a selected perspective of view; and
associate the representation data with the three-dimensional mapping data, wherein the associating the representation data with the three-dimensional mapping data comprises: generating a combined mapping data based on the representation data and the three-dimensional mapping data;
display the combined mapping data, wherein the representation data provides a preview image of the three-dimensional mapping data; and
adjust brightness of the preview image, wherein the adjusting brightness of the preview image comprises: obtaining a distribution of the brightness values of pixels in the preview image; calculating the mean value and the standard deviation based on the assumption of Gaussian distribution; and mapping linearly the brightness values within a range to the entire desired brightness range according to a range of the standard deviation.

19. The apparatus of claim 18, wherein the three-dimensional mapping data being associated with a file format, and wherein when associating the representation data with the three-dimensional mapping data, the instructions that, when executed by the processor, further cause the processor to:
generate the combined mapping data based on the representation data, the three-dimensional mapping data, and the file format.

20. The apparatus of claim 19, wherein when generating the combined mapping data, the instructions that, when executed by the processor, further cause the processor to:
insert the representation data into the three-dimensional mapping data.

* * * * *